US012634743B2

(12) United States Patent
Lee et al.

(10) Patent No.: US 12,634,743 B2
(45) Date of Patent: May 19, 2026

(54) DEADLINE-BASED DATA PACKETS

(71) Applicant: QUALCOMM Incorporated, San Diego, CA (US)

(72) Inventors: Hyun Yong Lee, San Diego, CA (US); Linhai He, San Diego, CA (US); Prashanth Haridas Hande, San Diego, CA (US); Mickael Mondet, Louannec (FR); Dario Serafino Tonesi, San Diego, CA (US); Diana Maamari, San Diego, CA (US); Ravi Agarwal, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 18/366,642

(22) Filed: Aug. 7, 2023

(65) Prior Publication Data

US 2024/0056876 A1 Feb. 15, 2024

Related U.S. Application Data

(60) Provisional application No. 63/370,911, filed on Aug. 9, 2022.

(51) Int. Cl.
*G06F 13/00* (2006.01)
*H04W 28/02* (2009.01)
(52) U.S. Cl.
CPC .............................. *H04W 28/0268* (2013.01)
(58) Field of Classification Search
CPC .... H04L 47/28; H04W 28/0268; H04W 28/02
(Continued)

(56) References Cited

U.S. PATENT DOCUMENTS 10,250,491 B2 * 4/2019 Lee ..................... H04W 12/084
2002/0031086 A1 * 3/2002 Welin ..................... H04L 47/24
370/428

(Continued)

FOREIGN PATENT DOCUMENTS

WO 2022/084483 4/2022
WO 2022/155821 7/2022

OTHER PUBLICATIONS

Qualcomm Incorporated: "KI#4 & K#5: Update of Solution 25", 3GPP Draft; S2-2204700, 3rd Generation Partnership Project (3GPP), Mobile Competence Centre; 650, Route Des Lucioles; F-06921 Sophia-Antipolis Cedex ; France, vol. SA WG2, No. e-meeting; May 16, 2022-May 20, 2022 May 6, 2022 (May 6, 2022), XP052160189. Retrieved from the Internet: URL:https://ftp.3gpp. org/tsg_sa/WG2_Arch/TSGS2_151E_Electronic_2022-05/Docs/S2-2204700.zip S2-2204700 FS_XRM 6 KI4 solution 25 update.doc [retrieved on May 6, 2022].

(Continued)

*Primary Examiner* — Kenneth R Coulter
(74) *Attorney, Agent, or Firm* — ArentFox Schiff, LLP

(57) ABSTRACT

Various aspects of the present disclosure generally relate to wireless communication. In some aspects, a user equipment transmits, to a network node, an indication of a data delivery deadline for data traffic to be delivered by the network node, wherein the data delivery deadline indicates by when the network node is to transmit one or more data packets received from the UE, and/or a nominal arrival time for the data traffic to be received at the network node, wherein the nominal arrival time in combination with a nominal delay budget indicates by when the network node is to transmit the one or more data packets received from the UE. Moreover, the UE transmits, to the network node, the one or more data (Continued)

500 ──► packets, which may include a protocol data unit (PDU), a group of PDUs, or a PDU set or burst.

30 Claims, 29 Drawing Sheets

(58) Field of Classification Search
USPC .................. 709/238, 220–222; 713/1, 2, 100
See application file for complete search history.

(56) References Cited

U.S. PATENT DOCUMENTS

| | | | |
|---|---|---|---|
| 2017/0324652 A1* | 11/2017 | Lee ..................... | H04L 47/2458 |
| 2023/0135681 A1* | 5/2023 | Agarwal ............... | H04L 5/0082 |
| | | | 370/329 |
| 2023/0345298 A1* | 10/2023 | Lee ....................... | H04L 47/564 |
| 2023/0362707 A1 | 11/2023 | Fu et al. | |

OTHER PUBLICATIONS

International Search Report and Written Opinion dated Dec. 1, 2023 from corresponding PCT Application No. PCT/US2023/071872.

* cited by examiner

Transmit, to a network node, an indication of one or more of a deadline, a periodicity, a nominal packet delay budget, a jitter of burst arrival times, or a nominal arrival time of data packets of a communication session

1010

Receive one or more data packets based at least in part on the one or more data packets arriving at or before the deadline

1020

1000

Receive an indication of one or more of a deadline, a periodicity, a nominal packet delay budget, a jitter of burst arrival times, or a nominal arrival time associated with data packets of a communication session Transmit one or more data packets based at least in part on the one or more data packets transmitted at or before the deadline

1110

1120

1100

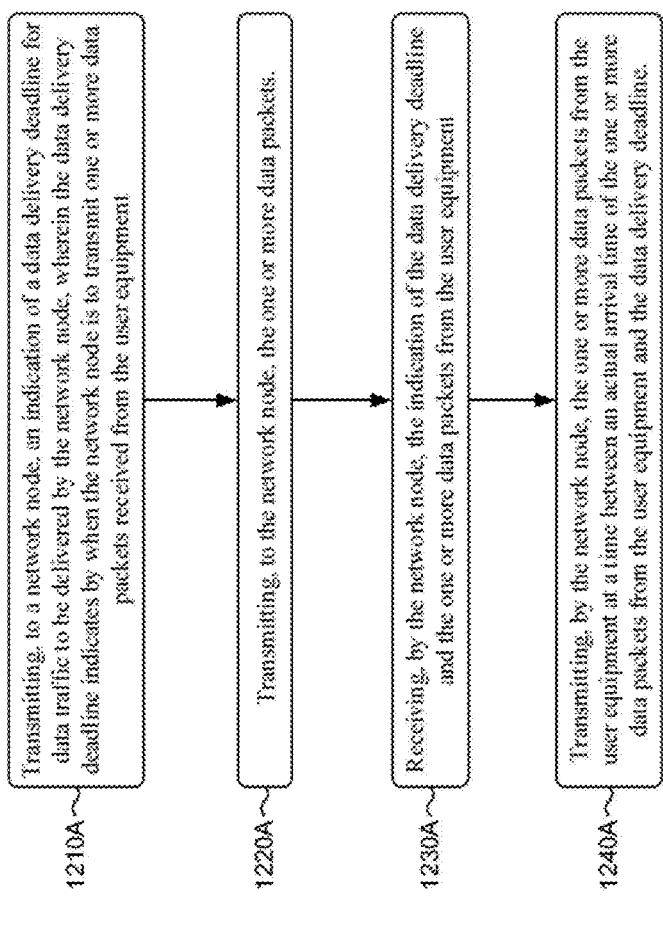

1210A — Transmitting, to a network node, an indication of a data delivery deadline for data traffic to be delivered by the network node, wherein the data delivery deadline indicates by when the network node is to transmit one or more data packets received from the user equipment 1220A — Transmitting, to the network node, the one or more data packets.

1230A — Receiving, by the network node, the indication of the data delivery deadline and the one or more data packets from the user equipment 1240A — Transmitting, by the network node, the one or more data packets from the user equipment at a time between an actual arrival time of the one or more data packets from the user equipment and the data delivery deadline.

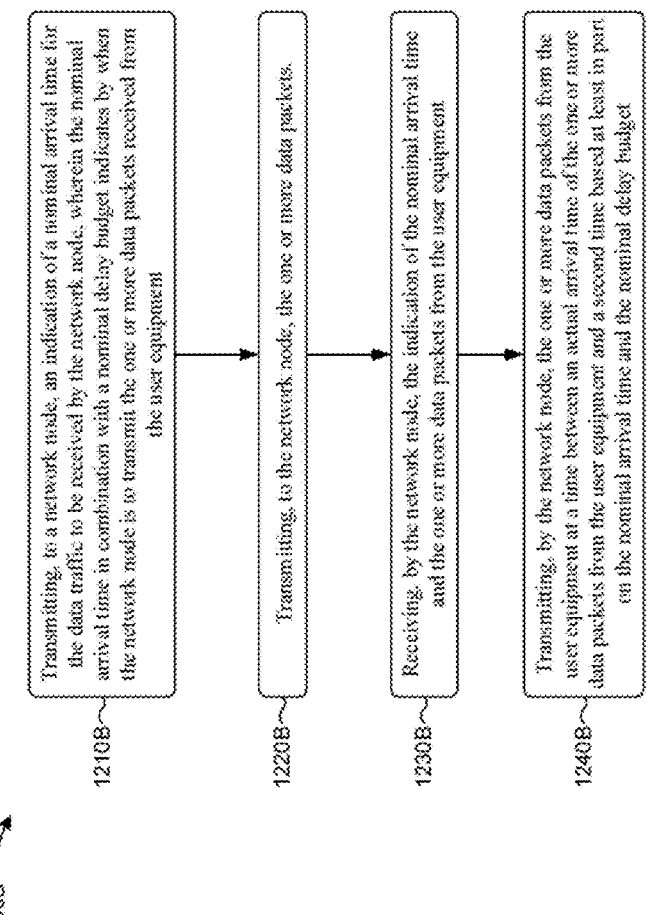

1210B Transmitting, to a network node, an indication of a nominal arrival time for the data traffic to be received by the network node, wherein the nominal arrival time in combination with a nominal delay budget indicates by when the network node is to transmit the one or more data packets received from the user equipment 1220B Transmitting, to the network node, the one or more data packets.

1230B Receiving, by the network node, the indication of the nominal arrival time and the one or more data packets from the user equipment 1240B Transmitting, by the network node, the one or more data packets from the user equipment at a time between an actual arrival time of the one or more data packets from the user equipment and a second time based at least in part on the nominal arrival time and the nominal delay budget

DDD = Data Delivery Deadline
NAT = Nominal Arrival Time
NDB = Nominal Delay Budget (= AN PDB access network packet delay budget)
DDD = NAT + NDB

2400

2600

2800

DEADLINE-BASED DATA PACKETS

CROSS REFERENCE TO RELATED APPLICATION(S)

This application claims the benefit of U.S. Provisional Application No. 63/370,911, entitled "DEADLINE-BASED DATA PACKETS" and filed on Aug. 9, 2022, the disclosure of which is expressly incorporated by reference herein in its entirety.

FIELD OF THE DISCLOSURE

Aspects of the present disclosure generally relate to wireless communication and to techniques and apparatuses for deadline-based data packets.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the IE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of controlling data traffic to a network by a user equipment (UE). The method includes transmitting, to a network node, an indication of at least one of a data delivery deadline for data traffic to be delivered by the network node, wherein the data delivery deadline indicates by when the network node is to transmit one or more data packets received from the UE, or a nominal arrival time for the data traffic to be received at the network node, wherein the nominal arrival time in combination with a nominal delay budget indicates by when the network node is to transmit the one or more data packets received from the UE; and transmitting, to the network node, the one or more data packets.

Some aspects described herein relate to a user equipment (UE) for wireless communication. The user equipment may include one or more memories and one or more processors coupled to the one or more memories. The one or more processors, individually or in combination, may be configured to transmit, to a network node, an indication of at least one of a data delivery deadline for data traffic to be delivered by the network node, wherein the data delivery deadline indicates by when the network node is to transmit one or more data packets received from the UE, or a nominal arrival time for the data traffic to be received at the network node, wherein the nominal arrival time in combination with a nominal delay budget indicates by when the network node is to transmit the one or more data packets received from the UE. The one or more processors, individually or in combination, may be further configured to transmit, to the network node, the one or more data packets.

Some aspects described herein relate to one or more non-transitory computer-readable media, individually or in combination, storing a set of instructions for wireless communication. The set of instructions comprise one or more instructions that, when executed by one or more processors of a user equipment (UE) individually or in combination, cause the UE to: transmit, to a network node, an indication of at least one of a data delivery deadline for data traffic to be delivered by the network node, wherein the data delivery deadline indicates by when the network node is to transmit one or more data packets received from the UE, or a nominal arrival time for the data traffic to be received at the network node, wherein the nominal arrival time in combination with a nominal delay budget indicates by when the network node is to transmit the one or more data packets received from the UE. The set of instructions, when executed by one or more processors of the UE individually or in combination, may transmit, to the network node, the one or more data packets.

Some aspects described herein relate to a method for wireless communication performed by a network node. The method includes receiving, by the network node, an indication of a data delivery deadline for data traffic to be delivered by the network node, wherein the data delivery deadline indicates by when the network node is to transmit one or more data packets received from a user equipment (UE): receiving, by the network node, the one or more data packets from the UE; and transmitting, by the network node, the one or more data packets from the UE at a time between an actual arrival time of the one or more data packets from the UE and the data delivery deadline.

Some aspects described herein relate to a network node for wireless communication. The network node includes one or more memories; and one or more processors, coupled to the one or more memories, individually or in combination, configured to receive an indication of a data delivery deadline for data traffic to be delivered by the network node, wherein the data delivery deadline indicates by when the network node is to transmit one or more data packets received from a user equipment (UE), receive the one or more data packets from the UE, and transmit the one or more data packets from the UE at a time between an actual arrival time of the one or more data packets from the UE and the data delivery deadline.

Some aspects described herein relate to one or more non-transitory computer-readable media, individually or in combination, storing a set of instructions for wireless communication. The set of instructions comprise one or more instructions that, when executed by one or more processors of a network node, individually or in combination, cause the network node to receive an indication of a data delivery deadline for data traffic to be delivered by the network node, wherein the data delivery deadline indicates by when the network node is to transmit one or more data packets received from a user equipment (UE), receive the one or more data packets from the UE, and transmit the one or more data packets from the UE at a time between an actual arrival time of the one or more data packets from the UE and the data delivery deadline.

Some aspects described herein relate to a method for wireless communication performed by a network node. The method includes receiving, by the network node, an indication of a nominal arrival time for the data traffic to be received at the network node, wherein the nominal arrival time in combination with a nominal delay budget indicates by when the network node is to transmit the one or more data packets received from the user equipment (UE); receiving, by the network node, the one or more data packets from the UE; and transmitting, by the network node, the one or more data packets from the UE at a first time between an actual arrival time of the one or more data packets from the UE and a second time based at least in part on the nominal arrival time and the nominal delay budget. Moreover, in an aspect, the second time is the nominal arrival time added to the nominal delay budget.

Some aspects described herein relate to a network node for wireless communication. The network node includes one or more memories; and one or more processors, coupled to one or more memories, configured to receive an indication of a nominal arrival time for the data traffic to be received at the network node, wherein the nominal arrival time in combination with a nominal delay budget indicates by when the network node is to transmit the one or more data packets received from the user equipment (UE), receive the one or more data packets from the UE, and transmit the one or more data packets from the UE at a first time between an actual arrival time of the one or more data packets from the UE and a second time based at least in part on the nominal arrival time and the nominal delay budget.

Some aspects described herein relate to one or more non-transitory computer-readable media, individually or in combination, storing a set of instructions for wireless communication. The set of instructions comprise one or more instructions that, when executed by one or more processors of a network node, individually or in combination, cause the network node to receive an indication of a nominal arrival time for the data traffic to be received at the network node, wherein the nominal arrival time in combination with a nominal delay budget indicates by when the network node is to transmit the one or more data packets received from the user equipment (UE), receive the one or more data packets from the UE, and transmit the one or more data packets from the UE at a first time between an actual arrival time of the one or more data packets from the UE and a second time based at least in part on the nominal arrival time and the nominal delay budget.

Aspects generally include a method, apparatus, system, computer program product, non-transitory computer-readable media, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 10 and 11, and 12A and 12B are diagrams illustrating example processes associated with deadline-based data packets, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
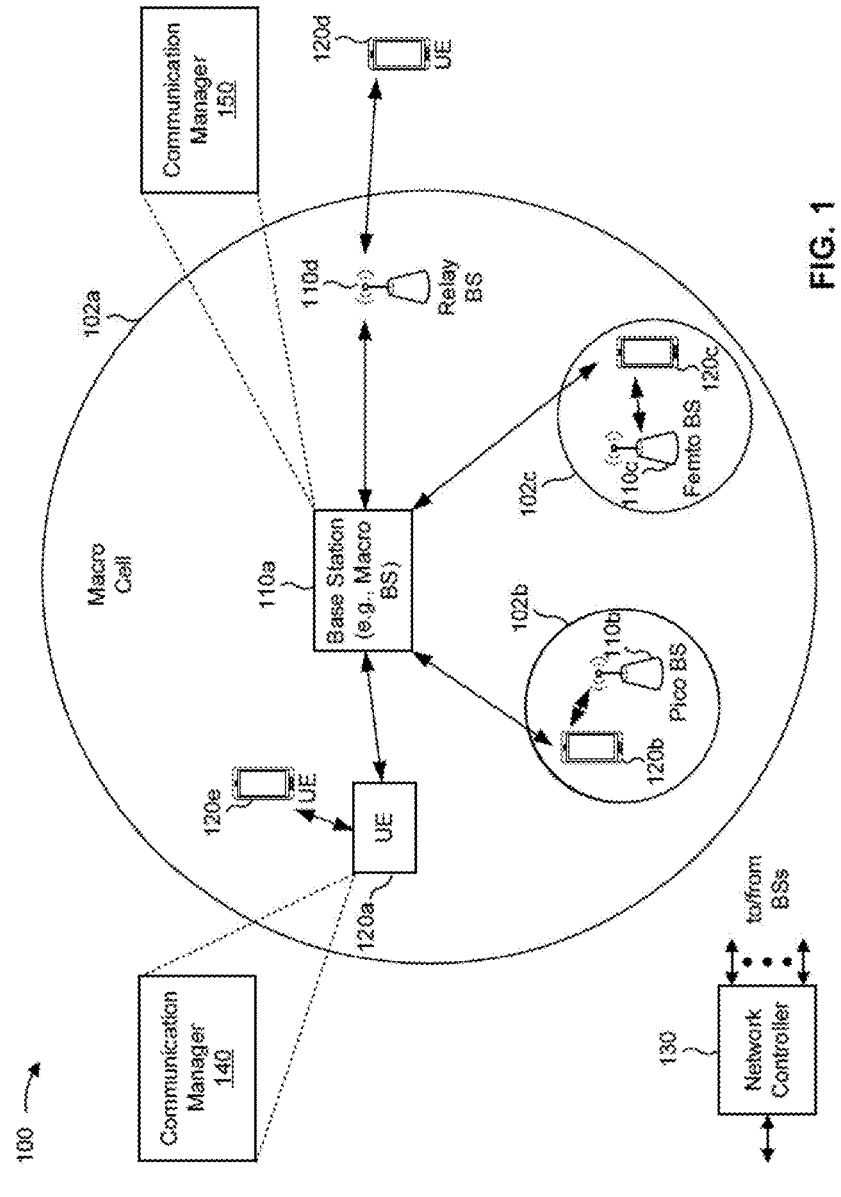
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNodeB (eNB) (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline or combination backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a phablet, a camera, a gaming device, a netbook, a smartbook, an ultrabook, a medical device, a biometric device, a wearable device (e.g., a smart watch, smart clothing, smart glasses, a smart headset (e.g. a virtual reality and/or augmented reality headset), a smart wristband, smart jewelry (e.g., a smart ring, a smart necklace, or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via one or more wireless media, individually or in combination.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as one or more processor components and/or one or more memory components. In some examples, the one or more processor components and the memory components may be coupled together. For example, the one or more processor components (e.g., one or more processors) and the one or more memory components (e.g., one or more memories) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in various documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, and/or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, and/or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network node, an indication of one or more of a deadline, a periodicity, a frequency, a nominal packet delay budget, a jitter of burst arrival times, and/or a nominal arrival time of data packets of a communication session; and receive one or more data packets based at least in part on the one or more data packets arriving at or before the deadline. Additionally, or alternatively, the communication manager 140 may perform one or more other operations described herein.

In some aspects, the network node may include a communication manager 150. As described in more detail elsewhere herein, the communication manager 150 may receive an indication of one or more of a deadline, a periodicity, a frequency, a nominal packet delay budget, a jitter of burst arrival times, and/or a nominal arrival time associated with data packets of a communication session; and transmit one or more data packets based at least in part on the one or more data packets transmitted at or before the deadline. Additionally, or alternatively, the communication manager 150 may perform one or more other operations described herein.

In some aspects, the term "base station" (e.g., the base station 110), "network node," and/or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," and/or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," and/or "network entity" may refer to one device configured to perform one or more functions, such as those described herein in connection with the base station 110. In some aspects, the term "base station," "network node," and/or "network entity" may refer to a plurality of devices configured to perform the one or more functions. For example, in some distributed systems, each of a number of different devices (which may be located in/at the same geographic location or in/at different geographic locations) may be configured to perform at least a portion of a function, and/or to duplicate performance of at least a portion of the function, and the term "base station," "network node," and/or "network entity" may refer to any one or more of those different devices. In some aspects, the term "base station," "network node," and/or "network entity" may refer to one or more virtual base stations and/or one or more virtual base station functions. For example, in some aspects, two or more base station functions may be instantiated and/or co-located at/in/on a single device. In some aspects, the term "base station," "network node," and/or "network entity" may refer to one of the base station functions and not another. In this way, a single device may include more than one base station.

As indicated above, FIG. 1 is provided as an example. Other examples may differ from what is described with regard to FIG. 1 and may include some features, devices, and/or components while excluding, omitting, and/or not requiring others.

Figure 2:
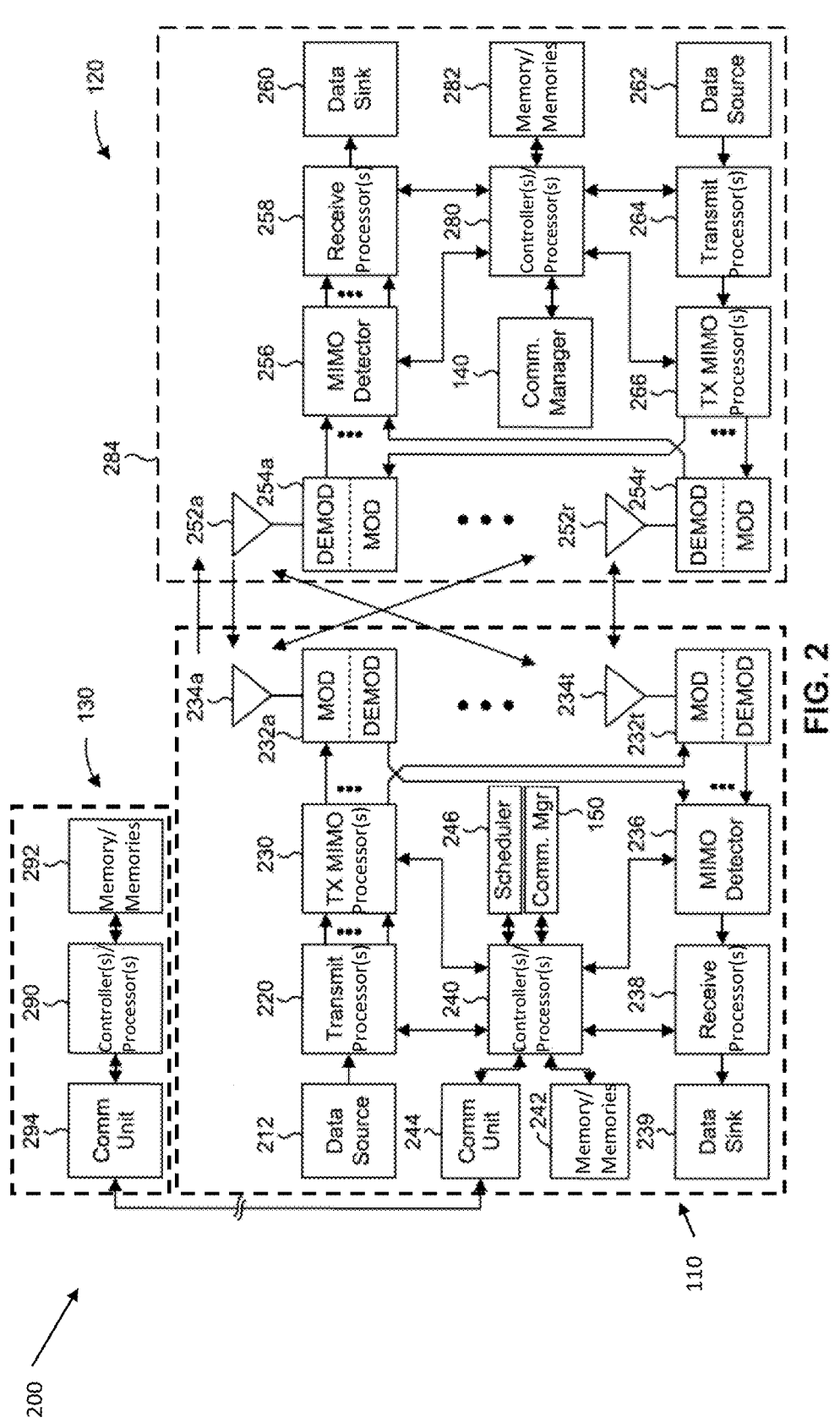
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, one or more transmit processors 220 may, individually or in combination, receive data from a data source 212, intended for the UE 120 (or a set of UEs 120). The one or more transmit processors 220 may, individually or in combination, select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The one or more transmit processors 220 may, individually or in combination, process system information (e.g., for semi-static resource partitioning information (SRPI) and control information (e.g., CQI requests, grants, and/or upper layer signaling) and provide overhead symbols and control symbols. The one or more transmit processors 220 may, individually or in combination, generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). One or more transmit (TX) multiple-input multiple-output (MIMO) processors 230 may, individually or in combination, perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, down-convert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. One or more receive processors 258 may, individually or in combination, process (e.g., demodulate and decode) the detected symbols, may provide decoded data for the UE 120 to a data sink 260, and may provide decoded control information and system information to one or more controllers/processors 280. The term "controllers/processors" may refer to one or more controllers, one or more processors, or a combination thereof. One or more channel processors may, individually or in combination, determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, one or more controllers/processors 290, and one or more memories 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, one or more transmit processors 264 may, individually or in combination, receive and process data from a data source 262 and control information (e.g., for reports that include RSRP, RSSI, RSRQ, and/or CQI) from the one or more controllers/processors 280. The one or more transmit processors 264 may, individually or in combination, generate reference symbols for one or more reference signals. The symbols from the one or more transmit processors 264 may be precoded by one or more TX MIMO processors 266, individually or in combination, if applicable, further processed by the modems 254 (e.g., for discrete Fourier transform spread OFDM (DFT-s-OFDM) or cyclic prefix (CP-OFDM)), and transmitted to the base station 110. In some examples, the modem 254 of the UE 120 may include a modulator and/or a demodulator. In some examples, the UE 120 includes a transceiver. The transceiver may include any combination of the antenna(s) 252, the modem(s) 254, the MIMO detector 256, the one or more receive processors 258, the one or more transmit processors 264, and/or the one or more TX MIMO processors 266 in various examples. The transceiver may be used by one or more processors (e.g., the one or more controllers/processors 280), individually or in combination, and the one or more memories 282 to perform aspects of any of the methods and their various functions and/or operations described herein (e.g., with reference to FIGS. 6-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by one or more receive processors 238, individually or in combination, to obtain decoded data and control information sent by the UE 120. The one or more receive processors 238 may, individually or in combination, provide the decoded data to a data sink 239 and provide the decoded control information to the one or more controllers/processors 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the one or more receive processors 238, the one or more transmit processors 220, and/or the one or more TX MIMO processors 230. The transceiver may be used by one or more processors (e.g., the one or more controllers/processors 240) and the one or more memories 242 to perform aspects of any of the methods and their various functions and/or operations described herein (e.g., with reference to FIGS. 6-13).

The one or more controllers/processors 240 of the base station 110, the one or more controllers/processors 280 of the UE 120, and/or any other component(s) of FIG. 2 may perform one or more techniques associated with deadline-based data packets, as described in more detail elsewhere herein. In some aspects, the network node described herein is the base station 110, is included in the base station 110, or includes one or more components of the base station 110 shown in FIG. 2. For example, one or more the controllers/processors 240 of the base station 110, the one or more controllers/processors 280 of the UE 120, and/or any other component(s) of FIG. 2 may, individually or in combination, perform or direct operations of, for example, process 1000 of FIG. 10, process 1100 of FIG. 11, process 1200A of FIG. 12A, process 1200B of FIG. 12B, and/or other processes as described herein. The one or more memories 242 and the one or more memories 282 may, individually or in combination, store data and program codes for the base station 110 and the UE 120, respectively. In some examples, the one or more memories 242 and/or the one or more memories 282, individually or in combination, may include one or more non-transitory computer-readable media, individually or in combination, storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, individually or in combination, the UE 120, and/or the base station 110 to perform or direct operations of, for example, process 1000 of FIG. 10, process 1100 of FIG. 11, process 1200A of FIG. 12A, process 1200B of FIG. 12B, and/or other processes as described herein. In some examples, executing instructions may include running the instructions, converting the instructions, compiling the instructions, and/or interpreting the instructions, among other examples.

In some aspects, the UE 120 includes means for transmitting, to a network node, an indication of one or more of a deadline, a periodicity, a frequency, a nominal packet delay budget, a jitter of burst arrival times, or a nominal arrival time of data packets of a communication session; and/or means for receiving one or more data packets based at least in part on the one or more data packets arriving at or before the deadline. The means for the UE to perform operations described herein may include, for example, one or more of communication manager 140, antenna 252, modem 254, MIMO detector 256, one or more receive processors 258, one or more transmit processors 264, one or more TX MIMO processors 266, one or more controllers/processors 280, or one or more memories 282.

In some aspects, the network node includes means for receiving an indication of one or more of a deadline, a periodicity, a frequency, a nominal packet delay budget, a jitter of burst arrival times, or a nominal arrival time associated with data packets of a communication session; and/or means for transmitting one or more data packets based at least in part on the one or more data packets transmitted at or before the deadline. In some aspects, the means for the network node to perform operations described herein may include, for example, one or more of communication manager 150, one or more transmit processors 220, one or more TX MIMO processors 230, modem 232, antenna 234, MIMO detector 236, one or more receive processors 238, one or more controllers/processors 240, one or more memories 242, or scheduler 246.

While blocks in FIG. 2 are illustrated as distinct components, the functions described above with respect to the blocks may be implemented in a single hardware, software, or combination component or in various combinations of components. For example, the functions described with respect to the one or more transmit processors 264, the one or more receive processors 258, and/or the one or more TX MIMO processors 266 may be performed by or under the control of the one or more controllers/processors 280.

As indicated above. FIG. 2 is provided as an example. Other examples may differ from what is described with regard to FIG. 2 and may include some features, devices, and/or components while excluding, omitting, and/or not requiring others.

Figure 3:
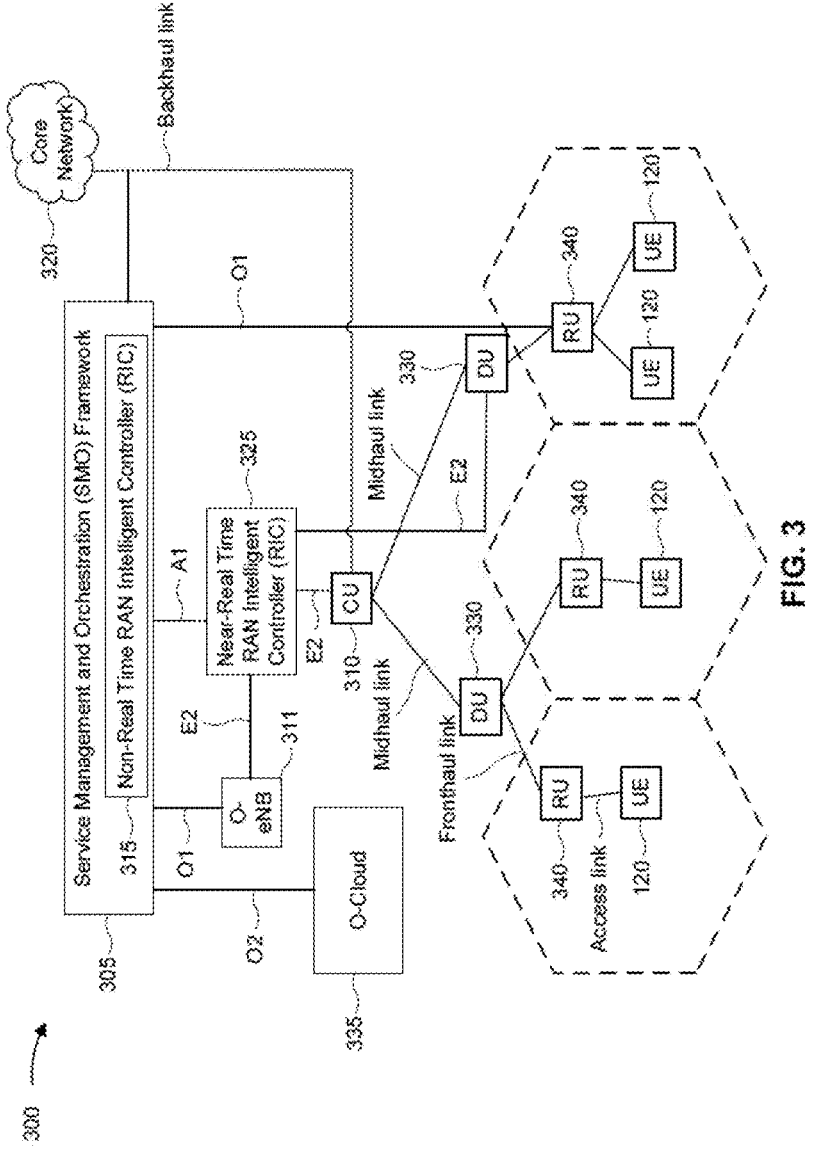
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an JAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more RF access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via one or more wired or wireless transmission media, individually or in combination. Each of the units, or one or more associated processors and/or controllers, individually or in combination, providing instructions to the communication interfaces of the units, can be configured to communicate with one or more of the other units via the one or more transmission media, individually or in combination. For example, the units can include a wired interface configured to receive or transmit signals over one or more wired transmission media, individually or in combination, to one or more of the other units. Additionally, the units can include a wireless interface, which may include a receiver, a transmitter, or transceiver (such as an RF transceiver), configured to receive or transmit signals, or both, over one or more wireless transmission media, individually or in combination, to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random-access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 335) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate A/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3 and may include some features, devices, and/or components while excluding, omitting, and/or not requiring others.

Figure 4:
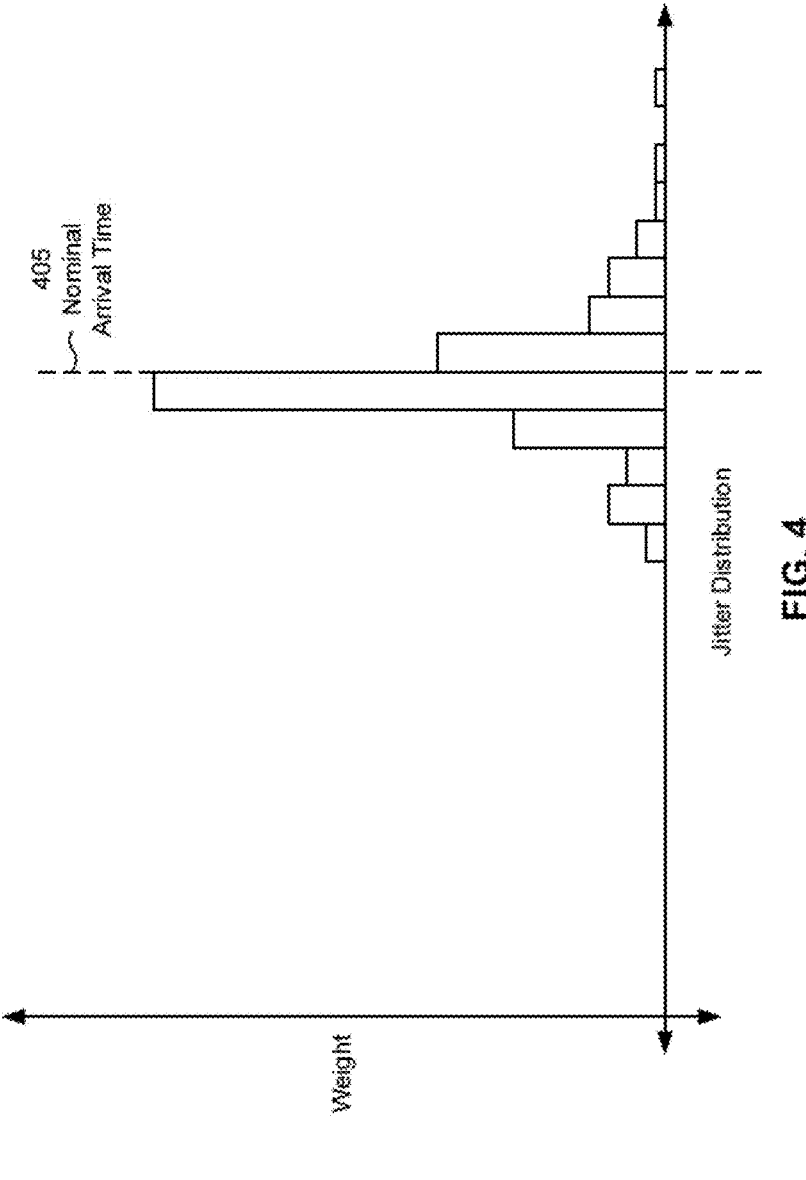
FIG. 4 is a diagram illustrating an example of a jitter distribution, in accordance with the present disclosure.

FIG. 4 is a diagram illustrating an example 400 of a jitter distribution, in accordance with the present disclosure. In some communications, data may be received quasi-periodically (i.e., periodic with jitter). For example, a network (e.g., a network node, such as a core network (CN) network node and/or a RAN network node) may receive data that is generally periodic with an offset from a nominal arrival time 405 that is periodic. The nominal arrival time 405 may be associated with a center of a burst arrival time distribution at a user plane function. The nominal arrival time 405 may have a periodicity and/or a frequency that is based at least in part on a multimedia periodicity and/or frequency associated with the communications (e.g., a refresh rate of a video stream and/or extended reality (XR) communications, among other examples).

As shown by example 400, some data may be received before the nominal arrival time 405 (e.g., early arrival data) and some data may be received after the nominal arrival time (e.g., late arrival data). In an example, a jitter distribution may have a spread in traffic arrival time of approximately 10 milliseconds (ms) in downlink traffic arrival times for split XR communications (e.g., where rendering processes are performed by a UE and a network node, such as an edge node).

The data may have jitter (e.g., offset from the nominal arrival time 405) based at least in part on a rendering time, an encoder time, and/or a Real Time Transport Protocol (RTP) packetization time at a device generating or forwarding the data (e.g., an application server).

In some networks, XR downlink traffic may have a burst (e.g., set of data packets associated with one or more scenes) arrival time at the network that is quasi-periodic. The jitter of burst arrival time may be equal to approximately 48% of XR periodicity (e.g. 8 ms vs 16.666 ms). In this way, the jitter highly affects an overall XR system performance of capacity and power consumption when using a packet delay budget (PDB) requirement.

An XR client at the UE may have a de-jitter buffer that saves burst packets until a periodic timing for display. In some examples, the PDB requirement may indicate expiration of data packets that may be on-time to the UE (e.g., with reception before the periodic timing for display by an amount of time to allow for processing before display). In this case, the network node may drop the data packets that may have otherwise been used to provide XR data to the UE. This may cause communication errors associated with the XR data, which may consume computing, power, communication, and/or network resources to detect and correct. Additionally, or alternatively, the communication errors may result in a communication configuration that reduces spectral efficiency based at least in part on the network node attempting to correct and/or reduce the errors.

As indicated above, FIG. 4 is provided as an example. Other examples may differ from what is described with regard to FIG. 4.

Figure 5:
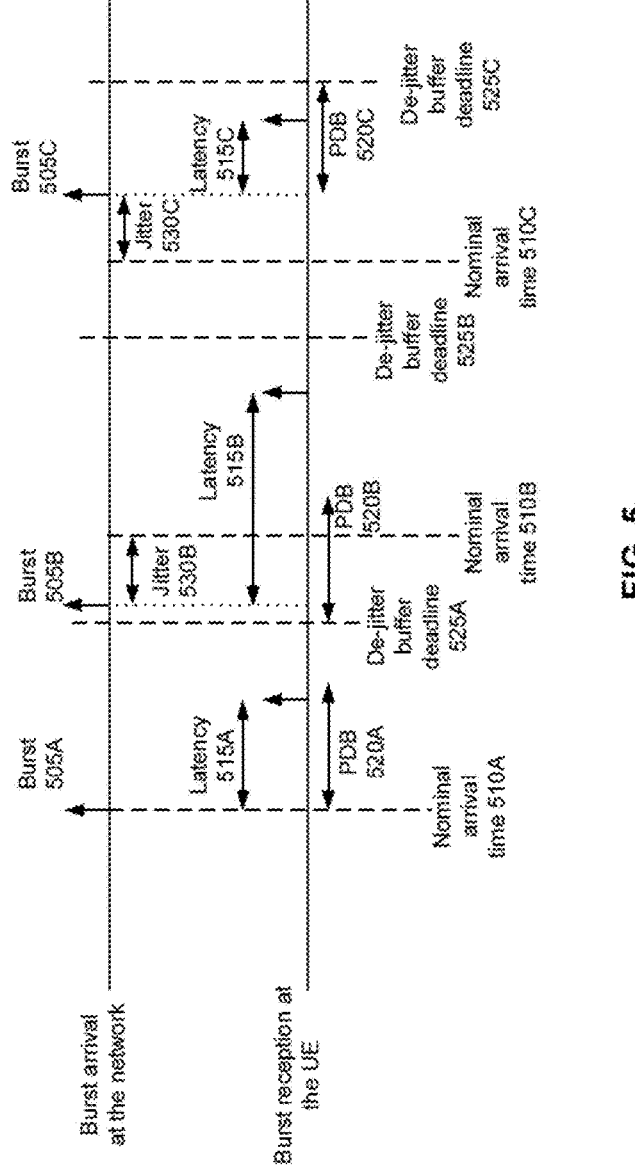
FIG. 5 is a diagram illustrating an example of packet delay budget constraints on jitter-based communications, in accordance with the present disclosure.

FIG. 5 is a diagram illustrating an example 500 of packet delay budget constraints on jitter-based communications, in accordance with the present disclosure.

As shown in FIG. 5, a burst 505A of data packets may be directed to a UE. The burst 505A may arrive at a network (e.g., a network node, such as a RAN network node and/or a CN network node, among other examples) at a time indicated in FIG. 5 relative to a nominal arrival time 510A. The nominal arrival time 510A may be associated with a periodic arrival time, from which the burst 505A may be offset by a jitter. However, the burst 505A may arrive at the nominal arrival time 510A, with a jitter of zero.

The network may transmit the burst 505A with reception at the UE at a time indicated in FIG. 5. An amount of time between arrival at the network and reception at the UE is a latency 515A. The network may determine whether to transmit the burst 505A based at least in part on whether the latency 515A exceeds a PDB 520A. The PDB 520 indicates an amount of time that the network is able to delay the burst 505A after arrival at the network and before delivery to the UE. If the PDB 520 is exceeded, the network may drop the burst 505A and consider data packets of the burst 505A as expired. The PDB may be established for a communication session associated with the UE and may be a fixed amount of time from arrival at the network.

Based at least in part on the latency 515A satisfying the PDB 520A, the network transmits the burst 505A to the UE. From a perspective of the UE, the UE must receive the burst 505A at or before a de-jitter buffer deadline 525A. The de-jitter buffer deadline 525A may be based at least in part on a display time and an amount of time required by the UE to process the burst 505A before displaying a scene associated with the burst SOSA via a display of the UE.

A burst 505B may arrive at the network at a time indicated in FIG. 5 relative to a nominal arrival time 510B. The burst 505B may arrive before the nominal arrival time 510B, with a jitter 530B having a negative value to indicate an arrival time that is before the nominal arrival time 510B.

The network may not transmit the burst 505B based at least in part on an expected reception at the UE at a time indicated in FIG. 5 being outside of a PDB 520B. For example, a latency 515B may be greater than the PDB 520. The network may drop the burst 505B and consider data packets of the burst 505B as expired even though the expected reception at the UE being before a de-jitter buffer deadline 525B associated with the burst 505B.

A burst 505C may arrive at the network at a time indicated in FIG. 5 relative to a nominal arrival time 510C. The burst 505C may arrive after the nominal arrival time 510C, with a jitter 530C having a negative value to indicate an arrival time that is after the nominal arrival time 510C.

The network may transmit the burst 505C based at least in part on an expected reception at the UE at a time indicated in FIG. 5 being within the PDB 520C. For example, a latency 515C may be less than the PDB 520. The network may transmit the burst 505B and consider data packets of the burst 505B timely. However, as shown in FIG. 5, the PDB 520C may extend beyond a de-jitter buffer deadline 525C. In this case, the network may transmit the burst 505C after the de-jitter buffer deadline 525C based at least in part on the PDB 520C indicating that the burst 505C is timely. This may consume computing, power, communication, and/or network resources to transmit the burst 505C when the data packets of the burst 505C are expired and will not be rendered for display by the UE.

In some networks, a network may attempt to prevent transmission of expired data to conserve computing, power, communication, and/or network resources. To prevent transmission of expired data, the network may configure a PDB with a reduced duration to account for a jitter of the data. For example, the network may reduce the duration of the PDB to prevent an amount of time of a jitter and the duration of the PDB from extending from the nominal arrival time 510C past the de-jitter buffer deadline 525C. However, reducing a duration of the PDB may result in an increased number of dropped packets, such as those of burst 505B, that may have otherwise be received at the UE before the nominal arrival time 510B. Additionally, or alternatively, the network may reduce communication capacity to ensure that the PDB is satisfied and that packets are not dropped. However, this may reduce a number of devices that may be supported on a cell of the network.

In some aspects, a playout buffer can be included in a multimedia system. A playout buffer can be used by a receiver device (e.g., UE) to store incoming packets and process the packets at regular intervals for periodic display. Video frame packets (e.g., in a data burst) can be stored in the buffer until processing starts according to a deadline. XR applications may only require that packets are delivered before the deadline. In FIG. 5, bursts 505A, 505B, and 505C each arrive before the deadline. While burst 505B arrives with latency greater than the PDB, it is no worse from the application client perspective. Thus, deadline delivery can allow for a relaxed latency budget for all bursts except the latest arriving burst as compared to PDB aspects where reduced PDB reduces the capacity.

As indicated above, FIG. 5 is provided as an example. Other examples may differ from what is described with regard to FIG. 5.

In some aspects described herein, a communication session may be associated with a deadline (e.g., a de-jitter buffer deadline) for reception of data packets at a UE. In some aspects, the deadline may replace a PDB that may have otherwise been configured for the data packets. Based at least in pan on use of the deadline, parameters for determining expiration of data packets and/or prioritization of transmission of the data packets may reflect actual timing requirements of the data packets with improved accuracy. In this way, a network node may schedule transmission of the data packets with improved efficiency, without unnecessarily prioritizing the data packets ahead of other data packets that have greater urgency. This may allow the network node to support additional devices in a cell operated by the network node, which may conserve computing, power, communication, and/or network resources that may have otherwise been used to form and/or operate an additional cell to support the additional devices.

In some aspects, the UE may determine timing of the deadline. For example, the UE may determine the deadline (e.g., the de-jitter buffer deadline) based at least in part on a periodic display time (e.g., associated with a refresh rate of multimedia of the communication session) and a device internal data processing time (e.g., 3GPP protocol layer processing time+internet protocol (IP) packet processing time+video decoding time, among other examples). In some aspects, the UE may use a longest processing time of estimated device internal data processing times as a conservative estimate for the deadline. Additionally, or alternatively, the UE may determine the deadline based at least in part on the periodic display time and an internal periodic timer to initiate video decoding.

The deadline may be associated with a packet generation timing adjustment (+/−) between an application server and an application client at the UE with a phase-locked loop (PLL) at an application layer of the communication session. In this way, at the application layer, the deadline may be set to nominal PDB+Nominal Arrival Time to minimize Motion-to-Render-Photon (M2R2P) latency.

Figure 6:
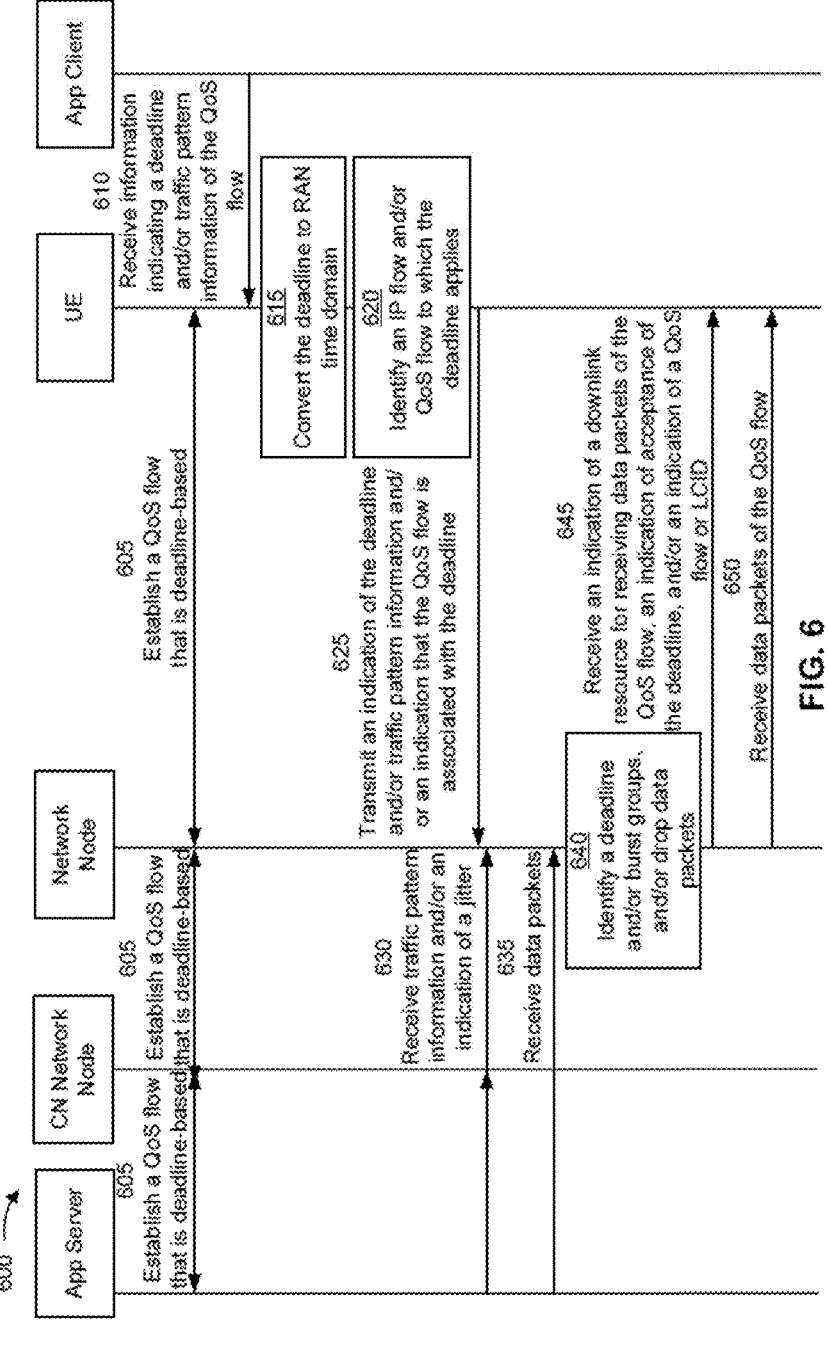
FIGS. 6-9 are diagrams illustrating examples associated with deadline-based data packets, in accordance with the present disclosure.

FIG. 6 is a diagram of an example 600 associated with deadline-based data packets, in accordance with the present disclosure. As shown in FIG. 6, multiple network nodes may communicate with a UE (e.g., UE 120). The multiple network nodes may include one or more base stations 110, one or more CUs, one or more DUs, one or more RUs, one or more core network nodes, one or more network servers, one or more application servers, and/or one or more access and mobility management functions (AMFs), among other examples. In some aspects, the UE and a network node (e.g., a RAN network node) of the multiple network nodes may be part of a wireless network (e.g., wireless network 100). The UE and the network node may have established a wireless connection prior to operations shown in FIG. 6.

In some aspects (e.g., as part of establishing the wireless connection) the network node may transmit, and the UE may receive, configuration information. In some aspects, the UE may receive the configuration information via one or more of RRC signaling, one or more MAC control elements (CEs), and/or downlink control information (DC), among other examples. In some aspects, the configuration information may include an indication of one or more configuration parameters (e.g., already known to the UE and/or previously indicated by the first network node or other network device) for selection by the UE, and/or explicit configuration information for the UE to use to configure the UE, among other examples.

In some aspects, the configuration information may indicate that the UE is to communicate in a communication session with a deadline instead of a PDB. The configuration information may indicate that the UE is to provide an indication of the deadline and/or traffic pattern information to the network node. In some aspects, the configuration information may indicate that the UE is to provide traffic pattern information associated with the deadline (e.g., in addition to the deadline or in place of the deadline for the network node to use to derive the deadline, among other examples). In some aspects, the configuration information may indicate that the UE is to transmit an indication that a QoS flow of the communication session is associated with the deadline. In some aspects, the configuration information may indicate that the UE is to receive an indication that the QoS flow of the communication session is associated with the deadline.

The UE may configure itself based at least in part on the configuration information. In some aspects, the UE may be configured to perform one or more operations described herein based at least in part on the configuration information.

As shown by reference number 605, the UE, the network node, a CN network node, and/or an application server may establish a QoS flow that is deadline-based. For example, the UE, the network node, the CN network node and/or the application server may establish a connection and/or parameters for communicating via the communication session. In some aspects (e.g., as part of establishing the QoS flow), the network node may indicate to the UE that the QoS flow is associated with the deadline and is not associated with a PDB. In some aspects (e.g., as part of establishing the QoS flow), the UE may indicate to the network node that the QoS flow is associated with the deadline and is not associated with a PDB. In some aspects, the CN network node and/or the application server may indicate to the network node that the QoS flow is associated with the deadline, is not associated with a PDB and/or that expiration of the data packets of the communication session is associated with the deadline, and is not associated with a PDB. In some aspects, the network node may transmit an indication (e.g., to the UE) that expiration of the data packets of the communication session is associated with the deadline and is not associated with a PDB.

In some aspects, the deadline is based at least in part on a periodic display time and a UE internal data processing time. For example, the deadline may be offset from the periodic display time by an amount that is equal to or greater than the UE internal data processing time. In some aspects, the periodic display time may be associated with display of a scene of a video feed, such as an XR video feed, among other examples.

In some aspects, the UE may receive (e.g., as part of establishing the QoS flow), an indication of a mapping of QoS flows to IP flows. The mapping may be used to translate an IP flow a QoS flow for indicating that the deadline applies to the QoS flow.

As shown by reference number 610, the UE may receive, from an app client (e.g., an application client of the UE or an application client of a connected device, among other examples), information indicating a deadline and/or traffic pattern information of the QoS flow. In some aspects, the information may indicate a deadline (e.g., de-jitter buffer deadline), a periodicity, a frequency, a nominal packet delay budget, a jitter of burst arrival times, and/or a nominal arrival time of data packets of the communication session among other examples.

In some aspects, the UE may identify a burst index of the data packets based at least in part on burst metadata available at an application layer of the data packets and/or a determined burst index based at least in part on timing of the data packets. In some aspects, the deadline is periodic, and the burst index is associated with an occasion of the deadline.

As shown by reference number 615, the UE may convert the deadline to a RAN time domain. For example, the UE may convert the deadline from a time relative to an application associated with the QoS flow or an absolute time to a RAN time domain unit, such as a subframe number and/or a slot number, among other examples. In some aspects, the UE may convert the deadline into a RAN time domain that comprises converting the deadline from an application time domain to the RAN time domain based at least in part on deadline mapping associated with a quality of service (QoS) flow, one or more deadline notification messages, and/or one or more data radio bearer (DRB) QoS parameters associated with the deadline, among other examples. In some aspects, the UE may receive the deadline mapping, the deadline notification messages, and/or the DRB QoS parameters during or after establishing the QoS flow described in connection with reference number 605 and/or via the application client, among other examples.

As shown by reference number 620, the UE may identify an IP flow and/or the QoS flow to which the deadline applies. For example, the UE may be aware of the IP flow associated with the deadline based at least in part on the communication session and/or the data packets being associated with the IP flow via the application client. In some aspects, the UE may use an IP flow to QoS flow mapping to identify the QoS flow from the IP flow. In some aspects, the UE may identify an IP flow to which the deadline applies based at least in part on an indication of the IP flow via an application layer of the data packets and/or a determined logical channel identification based at least in part on an IP packet index of the data packets in the IP flow, among other examples.

As shown by reference number 625, the UE may transmit, and the network node may receive, an indication of the deadline and/or traffic pattern information (e.g., additional traffic pattern information) and/or an indication that the QoS flow is associated with the deadline. In some aspects, traffic pattern information may include a nominal packet delay budget, a jitter of burst arrival times, or a nominal arrival time of data packets of a communication session associated with the QoS flow. In some aspects, the deadline may include a converted deadline (e.g., converted from application-based time or absolute time to a RAN time, such as a subframe number and/or slot number, among other examples).

In some aspects, the UE may transmit additional or alternative information. For example, the UE may transmit an indication that a QoS flow or logical channel associated with the data packets is associated with the deadline, an indication of a burst index associated with an occasion of the deadline, and/or an indication that a logical channel identification associated with the data packets is associated with the deadline, among other examples.

In some aspects, the UE may receive an additional indication that the QoS flow or logical channel is configured with the deadline and transmitting an indication that the QoS flow or logical channel associated with the data packets is associated with the deadline. For example, the network node may indicate that the QoS flow is a deadline-based QoS flow. In some aspects, the network node may indicate that the network node is informed of the deadline based at least in part on receiving the traffic pattern information and/or an indication of a jitter of the QoS flow from the CN network node, the application server, and/or the UE, among other examples.

In some aspects, the UE may transmit the indication of one or more of the deadline, the periodicity, the frequency, the nominal packet delay budget, the jitter of burst arrival times, or the nominal arrival time of data packets of the communication session via an RRC message, a MAC CE, and/or an application layer indication, among other examples.

In some aspects, the UE may transmit the indication of the deadline and/or the traffic pattern information to a CU of the network (e.g., the network node or a component of the network node). The CU may forward the deadline and/or the traffic pattern information to a DU of the network (e.g., the network node or a component of the network node). In some aspects, the CU may use the traffic information to derive the deadline and may forward the deadline to the DU.

As shown by reference number 630, the network node may receive, and the CN network node may provide, traffic pattern information and/or an indication of jitter associated with the QoS flow. In some aspects, the traffic pattern information may include the periodicity, the frequency, the nominal packet delay budget, the jitter of burst arrival times, and/or the nominal arrival time of data packets of the communication session, among other examples. In some aspects, the network node may derive the deadline based at least in part on the traffic pattern information and/or the jitter.

In some aspects, the network node may receive the traffic pattern information from the CN network node as an alternative from receiving the traffic pattern information from the UE. In some aspects, the network node may receive one or more information elements of the traffic pattern information from the CN network node one or more additional information elements of the traffic pattern information from the UE.

In some aspects, the network node may receive the indication of the jitter via a user plane header. For example, the network node may receive the indication of the jitter in a general packet radio services (GPRS) tunnelling protocol user plane (GTP-U) header. In some aspects, the jitter is based at least in part on an actual burst arrival time at the network and a nominal arrival time associated with the data packets. In this way, the jitter may indicate a deadline occasion to which the data packets belong. For example, a positive jitter may indicate that the data packets may be close to the deadline. Alternatively, a negative jitter may indicate that the data packets are early and are not close to the deadline (e.g., if the data packets are close to a deadline, apply a subsequent occasion of the deadline to the data packets).

As shown by reference number 635, the network node may receive data packets from the application server (e.g., via the CN node). In some aspects, the data packets may be associated with the QoS flow and may be addressed to the UE.

As shown by reference number 640, the network node may identify a deadline and/or burst groups, and/or may drop data packets. In some aspects, the network node may identify the deadline based at least in part on receiving an indication of the deadline or based at least in part on deriving the deadline using the traffic pattern information received via the UE and/or the CN network node, among other examples. In some aspects, the network node may identify the deadline based at least in part on one or more of the periodicity, the frequency, the nominal packet delay budget, the jitter of burst arrival times, and/or the nominal arrival time of data packets. For example, the network node may derive the deadline and/or may determine an occasion of the deadline to apply to the data packets.

In some aspects, the network node may identify a deadline occasion associated with the data packets. For example, the deadline may be periodic, such that a data packet received late for a first deadline occasion may be received before a second deadline occasion. The network node may first identify which deadline occasion applies to the data packets and then determine whether the data packets are timely (e.g., satisfy the deadline).

In some aspects, the network node may drop data packets based at least in part on failing to satisfy the deadline. For example, the network node may drop data packets that the network node is unable to schedule for transmission to the UE before or at the deadline.

In some aspects, the network node may identify a deadline that applies to the data packets based at least in part on a burst group of the data packets. For example, the network node may group data packets into a burst group based at least in part on the indication of the deadline, a periodicity, a frequency, a nominal packet delay budget, the jitter of burst arrival times, or the nominal arrival time of data packets of the communication session. For example, the network node may group data packets into a group associated with a deadline based at least in part on receiving the data packets within a threshold amount of time from the nominal arrival time and/or one or more deadlines (e.g., a previous deadline, a (current/active) deadline, and/or a subsequent deadline).

As shown by reference number 645, the UE may receive, and the network node may transmit an indication of a downlink resource for receiving the data packets of the QoS flow, an indication of acceptance of the deadline, and/or an indication of the QoS or logical channel identification (LCID) associated with the deadline. In some aspects, the downlink resource may be based at least in part on the indication of the deadline, the periodicity, the frequency, the nominal packet delay budget, the jitter of burst arrival times, and/or the nominal arrival time of data packets of the communication session. For example, the network node may schedule the downlink resource to satisfy the deadline. In this way, the network node may prioritize the data packets appropriately while allowing transmission of additional data packets that may have a greater urgency.

In some aspects, the network node may transmit an indication that the network node accepts the deadline and/or one or more traffic pattern information elements, such as the periodicity, the frequency, the nominal packet delay budget, the jitter of burst arrival times, or the nominal arrival time of data packets of the communication session.

In some aspects, the network node may transmit an indication to the UE that a QoS flow or logical channel associated with the data packets is associated with the deadline, an indication of a burst index associated an occasion of the deadline, and/or an indication that an LCID associated with the data packets is associated with the deadline.

In some aspects, the network node may transmit an additional indication that the QoS flow or logical channel is configured with the deadline based at least in part on receiving the indication that the QoS flow or logical channel associated with the data packets is associated with the deadline. For example, the network node may confirm that the QoS flow is configured to use the deadline based at least in part on receiving the indication that the QoS flow is associated with the deadline (e.g., from the UE, the application server, and/or the CN network node, among other examples).

In some aspects, in preparation and/or in a determination to transmit the data packets, the network node may identify the QoS associated with the data packets, apply the deadline to the data packets based at least in part on the QoS flow being associated with the deadline, and/or apply a periodic occasion of the deadline to the data packets based at least in part on a time at which the network node receives the data packets or an indication of a burst number of the data packets.

As shown by reference number 650, the UE may receive, and the network node may transmit, the data packets of the QoS flow. In some aspects, the UE may receive, and the network node may transmit, the data packets based at least in part on the reception time and/or expected reception time of the data packets satisfying (e.g., being at or before) the deadline.

Based at least in part using the deadline, parameters for determining expiration of data packets and/or prioritization of transmission of the data packets may reflect actual timing requirements of the data packets with improved accuracy. In this way, a network node may schedule transmission of the data packets with improved efficiency, without unnecessarily prioritizing some data packets (e.g., associated with a particular data flow) ahead of other data packets that have greater urgency (e.g., associated with another data flow). This may allow the network node to support additional devices in a cell operated by the network node, which may conserve computing, power, communication, and/or network resources that may have otherwise been used to form and/or operate an additional cell to support the additional devices.

As indicated above, FIG. 6 is provided as an example. Other examples may differ from what is described with respect to FIG. 6.

Figure 7:
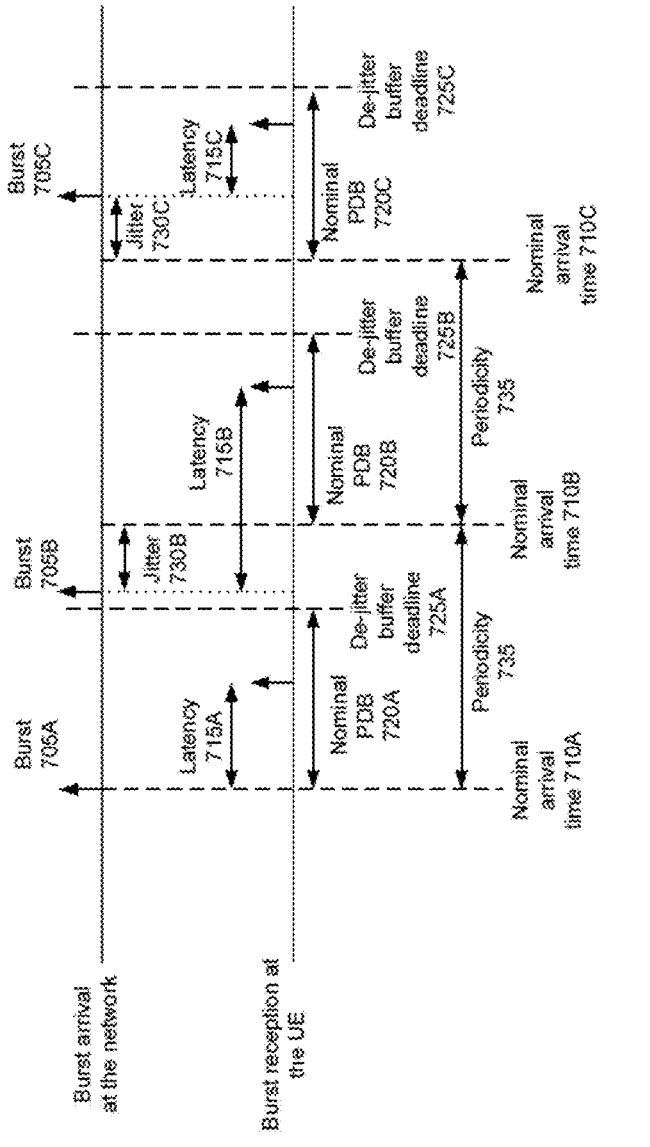

FIG. 7 is a diagram of an example 700 associated with deadline-based data packets, in accordance with the present disclosure. As shown in FIG. 7, a UE (e.g., UE 120) may communicate with a network (e.g., with one or more network nodes of the network). The network may include one or more base stations 110, one or more CUs, one or more DUs, one or more RUs, one or more core network nodes, one or more network servers, one or more application servers, and/or one or more AMFs, among other examples. In some aspects, the UE and a network node (e.g., a RAN network node) of the multiple network nodes may be part of a wireless network (e.g., wireless network 100). The UE and the network node may have established a wireless connection prior to operations shown in FIG. 7.

As shown in FIG. 7, a burst 705A of data packets may be directed to a UE. The burst 705A may arrive at a network (e.g., a network node, such as a RAN network node and/or a CN network node, among other examples) at a time indicated in FIG. 7 relative to a nominal arrival time 710A. The nominal arrival time 710A may be associated with a periodic arrival time, from which the burst 705A may be offset by a jitter. However, the burst 705A may arrive at the nominal arrival time 710A, with a jitter of zero.

The network may transmit the burst 705A with reception at the UE at a time as indicated in FIG. 7. An amount of time between arrival at the network and reception at the UE is a latency 715A. A nominal PDB 720A may be an amount of time between the nominal arrival time 710 and a de-jitter buffer deadline 725A before or during which the network node may transmit the burst 705A to the UE without failing to satisfy the de-jitter buffer deadline 725A.

The network may determine whether to transmit the burst 705A based at least in part on whether the network node can transmit the burst 705A such that the UE receives the burst 705A at or before the de-jitter buffer deadline 725A. If the de-jitter buffer deadline 725A is missed, the network may drop the burst 705A and consider data packets of the burst 705A as expired.

Based at least in part on the latency 715A satisfying the de-jitter buffer deadline 725A, the network transmits the burst 705A to the UE. From a perspective of the UE, the UE must receive the burst 705A at or before a de-jitter buffer deadline 725A. In this way, the same deadline (e.g., the de-jitter buffer deadline 725A) is applied to the data packets at the network and at the UE. The de-jitter buffer deadline 725A may be based at least in part on a display time and an amount of time required by the UE to process the burst 705A before displaying a scene associated with the burst 705A via a display of the UE.

A burst 705B may arrive at the network at a time indicated in FIG. 7 relative to a nominal arrival time 710B. The burst 705B may arrive before the nominal arrival time 710B, with a jitter 730B having a negative value to indicate an arrival time that is before the nominal arrival time 710B.

The network may transmit the burst 705B based at least in part on an expected reception at the UE at a time indicated in FIG. 7 being at or before the de-jitter buffer deadline 725B and/or the nominal PDB 720B. For example, a latency 715B may not control whether the network node transmits the data packets, even if the latency 715B is greater than the nominal PDB 720B.

A burst 705C may arrive at the network at a time indicated in FIG. 7 relative to a nominal arrival time 710C. The burst 705C may arrive after the nominal arrival time 710C, with a jitter 730C having a negative value to indicate an arrival time that is after the nominal arrival time 710C.

The network may transmit the burst 705C based at least in part on an expected reception at the UE at a time indicated in FIG. 7 being at or before the de-jitter buffer deadline 725C and/or the nominal PDB 720C. In some aspects, the network node may transmit the burst 705C with a relatively short latency 715C to satisfy the de-jitter buffer deadline 725C. For example, the network node may prioritize the burst 705C to transmit the burst 705C at or before the de-jitter buffer deadline 725C.

The nominal arrival times 710 are associated with a periodicity 735. The periodicity 735 may be based at least in part on an application associated with the data packets. For example, the periodicity 735 may be associated with a refresh rate of a video feed for a video to be displayed via the UE, which may be an XR video feed.

As indicated above, FIG. 7 is provided as an example. Other examples may differ from what is described with regard to FIG. 7.

Figure 8:
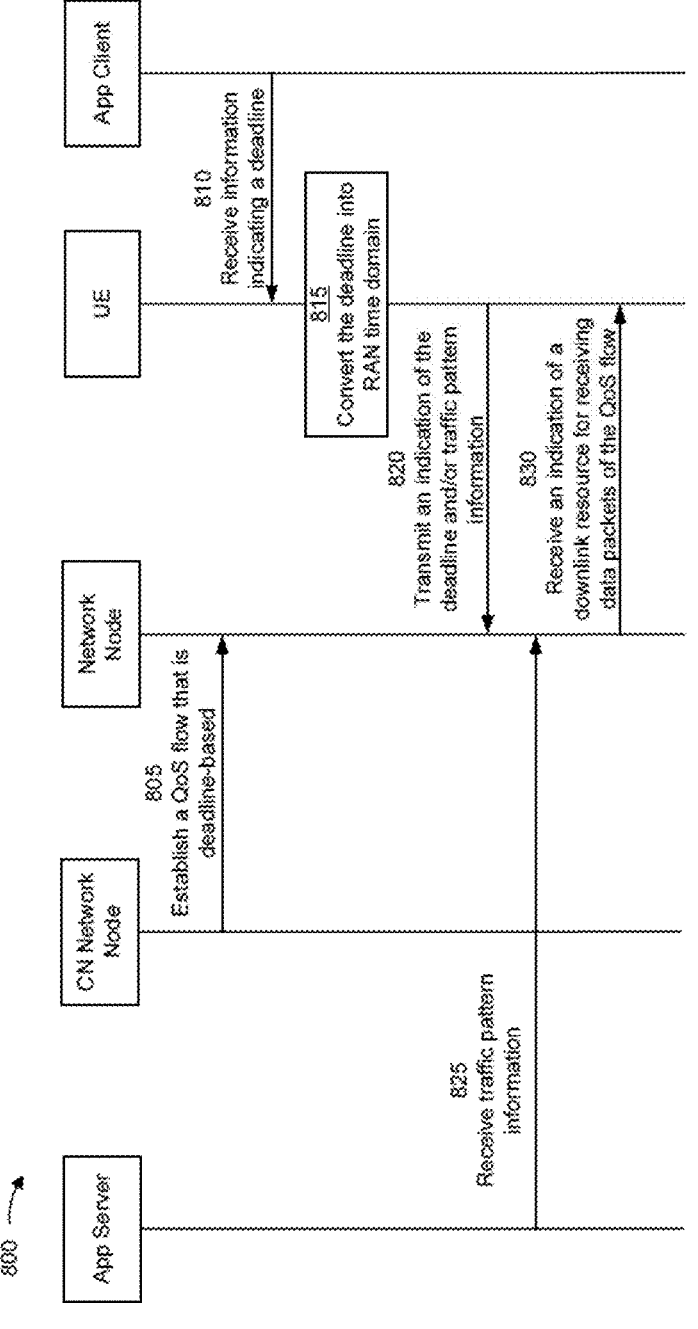

FIG. 8 is a diagram of an example 800 associated with deadline-based data packets, in accordance with the present disclosure. As shown in FIG. 8, multiple network nodes may communicate with a UE (e.g., UE 120). The multiple network nodes may include one or more base stations 110, one or more CUs, one or more DUs, one or more RUs, one or more core network nodes, one or more network servers, one or more application servers, and/or one or more AMFs, among other examples. In some aspects, the UE and a network node (e.g., a RAN network node) of the multiple network nodes may be part of a wireless network (e.g., wireless network 100). The UE and the network node may have established a wireless connection prior to operations shown in FIG. 8.

As shown by reference number 805, the CN network node may establish a QoS flow that is deadline-based. For example, the CN network node (e.g., the 5G core network) may set a new "QoS flow with deadline" in a protocol data unit (PDU) session. The QoS flow may define a deadline instead of a PDB.

For a QoS flow with a deadline, the UE may define its own deadline by indicating the timing to the network node, or the deadline may eventually converge to a nominal arrival time+nominal PDB. In some aspects, a 5G QoS flow table may include a new information element that indicate packet delivery requirement of 'deadline' instead of 'PDB. For example, the deadline may be defined with PDU set design parameters such as ADB and AER.

In some aspects, the CN network node may decide which IP flow is set for QoS flow with deadline (e.g., using Policy Control Function (PCF)/Session Management Function (SMF)). In some aspects, the CN network node may indicate to the network node which QoS flow is set for deadline during a PDU session establishment. In some aspects, the CN network node may indicate to the UE which QoS flow is set for deadline with a non-access stratum (NAS) message. Additionally, or alternatively, the network node may indicate to the UE which LCID is set for deadline with an RRC message.

In some aspects, related information elements in a communication standard may be extended. For example, [CN to NAS] N11/N2 interfaces+F1/E1 interfaces (e.g. PDU session—QoS Parameters); [CN to UE] NAS messages (e.g. indicate QoS flow for deadline); and/or [gNB to UE] RRC messages (e.g. indicate LCID for deadline).

As shown by reference number 810, the application client may provide, and the UE may receive, information indicating the deadline. In some aspects, the application client may provide the information indicating the deadline using an application layer indication (e.g., an X-layer Application Programming Interface (API)). In some aspects, the LIE and/or the application client may not need to indicate a burst index and/or PDU set index in example 800. In some aspects, the UE and/or the application client may need to indicate a burst index and/or PDU set index in example 800.

In some aspects, the application layer indicates the deadline of an IP flow to a modem of the UE with an X-layer API (e.g., to translate an application deadline into a deadline that the network node understands).

The application client may indicate specific timing of a UE internal clock for the deadline. The application client calculates the deadline from a de-jitter buffer timing and translates it to UE clock timing. Clocks of the modem of the UE and the application client may be different, thus the application client may need to map (e.g., continuously or periodically map) the UE clock timing and application timing to compensate for a clock drift.

The application client may indicate a burst index (or PDU set index) and/or an internal IP packet index to the UE. For example, the application client may indicate which burst index is associated with the deadline. If burst metadata (or PDU set metadata) is available at the application layer, the application client may explicitly indicate the burst index to the UE. If the burst metadata is unavailable at the application layer, the application client may provide an IP packet index of the deadline, which may be internally assumed between the UE and the application client, and the UE may translate the IP packet index to a burst index (or PDU set index). A UE interface may be used to provide the burst metadata (or PDU set metadata) index to the UE, and the UE may need to keep the mapping information between burst index (or PDU set index) and the IP packet index.

The application client may provide an indication of an IP flow or an internal IP packet index. For example, the application layer may indicate which IP flow (e.g., IP 5-tuple) is associated with the deadline. In another example, the application layer may provide an IP packet index and the UE may translate the IP packet index to an associated LCID.

The application client may indicate a traffic pattern and requirement. In some aspects, instead of an enhanced tandem switching administration channel interface (enhanced TSCAI or eTSCAI) (application server to network node), the application server may indicate the traffic pattern and requirement (e.g., periodicity, frequency, nominal PDB, nominal arrival time, among other examples) to the application client, and the UE may send all information related to the deadline to the network node.

As shown by reference number 815, the UE may convert the deadline into a RAN time domain. In some aspects, the UE may convert the deadline using a deadline mapping with the QoS flow (e.g., X-layer API). In some aspects, the UE may use a deadline notification message (e.g., a 3GPP-RRC message). In some aspects, the UE may use DRB QoS parameters for the deadline (e.g., a deadline key performance indicator (KPI)).

In some aspects, the application layer does not know information of the QoS flow, thus the UE may need to provide an indication of the QoS flow to the network node. In some aspects, the UE is provided with a packet filter for an uplink direction with an NAS message, but the UE may not be provided with a packet filter for the downlink direction. In some aspects, the network (e.g., CN network node) may provide the information of uplink and downlink packet filters to the UE with an NAS message (mapping relationship between IP flows and QoS flows). In some aspects, the network may indicate a packet filter with traffic flow template (TFT) or service data flow (SDF) templates). For example, the network may indicate a packet filter that typically consists of an IP 5-tuple={source IP, destination IP, source Port, destination Port, Protocol ID}. Based at least in part on the DL TFT, the UE translates an IP flow to a QoS flow.

As shown by reference number 820, the UE may transmit, and the network node may receive, an indication of the deadline and/or traffic pattern information. In some aspects, the UE may transmit the indication of the deadline and/or the traffic pattern information via an RRC message. For example, the UE may transmit a message with information elements indicating deadline notification: deadline, burst index, and/or QoS flow or LCID.

In some aspects, the UE may have multiple flows so the UE may need to specify which QoS flow has the deadline and/or which QoS flows are associated with which deadlines. In some aspects, for QoS mapping in a downlink direction, the CN SMF (e.g., at a NAS level) may indicate the mapping using an IP flow to QoS flow (e.g., via a packet filter, TFT, or otherwise), a network node may use an SDAP layer (e.g., access stratum level) to indicate a QoS flow to DRB (e.g., with n:1 mapping), and/or a network node may use a RLC layer to indicate DRB to LCID (e.g., with 1:1 mapping).

In some aspects, the UE may indicate the deadline of a burst and/or PDU set to the network node using a MAC CE command or an RRC message. For example, with a MAC CE command, the deadline is directly related to scheduling of the MAC layer (e.g., deadline-based scheduling). Using an RRC message, the network node may negotiate timing of the deadline between the UE and the network node with an RRC protocol.

In some aspects, the indication of the deadline of a burst (e.g., PDU set) may include one or more protocol information elements. For example, the indication may include the deadline (e.g., translated to 5G system clock), a burst index (PDU set index), and/or a QoS flow or LCID. The deadline indication may indicate specific timing of the deadline in a RAN system clock. For example, the UE translates the deadline timing that is indicated by the application client in the UE internal clock to the RAN system clock. The UE may need a time-synchronization between the application client and the UE for this translation. In some aspects, the time in the RAN system clock may include a subframe number (SFN)(e.g., latest or partial bits), a subframe index (e.g., 10-bit, ms), and/or a slot index. Additionally, or alternatively, the time in the RAN system clock may include an SFN reference time (e.g., latest or partial bits), a time difference between the SFN reference time, and the deadline (e.g., ins (milliseconds) or microseconds)

The indication of the burst index (or PDU set index) may indicate which burst (or PDU set) has the specific timing of the deadline. If the application layer does not have the explicit burst index, the UE may translate the IP packet index to the burst index (or PDU set index)

The indication of the QoS Flow or LCID may include the UE indicating which QoS flow has the deadline. For example, the UE may translate an IP flow indicated by the application client to a QoS flow. Additionally, or alternatively, the UE may indicate which LCID has the deadline. In this way, the RAN can handle the deadline without any information from an upper layer. However, all QoS flows in an LCID may have the same deadline requirement.

In some aspects, the network node may respond to the indication of the deadline and/or the traffic pattern information with an indication of acceptance or rejection. In some aspects, deadlines provided by individual UEs may not be acceptable at the network node side, so the network node may negotiate the deadline with the UE.

If a deadline is not acceptable at the network node side, the network node may send a rejection message to the UE. In some aspects, the network node may provide a negotiated deadline to the UE. Additionally, or alternatively, if the deadline is rejected, the UE may need to adjust a display timing for display of a video via a display of the UE based at least in part on an updated deadline.

In some aspects, the UE may transmit the indication of the deadline and/or the traffic pattern to a CU (e.g., the network node or a component of the network node). The CU may provide the indication of the deadline and/or the traffic pattern to a DU. In some aspects, the CU may use a new DRB QoS parameter to indicate the deadline over an F1 interface (e.g., CU to DU). For example, the DU may indicate provide the indication using an information flow, such as UE context to DRB to QoS flow level QoS parameters to dynamic 5G QoS identifier (5QI) descriptor. In some aspects, the CU may specify the deadline timing to the DU with a dynamic descriptor. In some aspects, the CU may mark and/or indicate that this QoS flow is associated with the deadline, and indicate the deadline timing. In some aspects, the DU may can send back to the CU an accept or reject message.

As shown by reference number 825, the network node may receive traffic pattern information from the application server. For example, the network node may receive periodicity, frequency, and/or nominal PDB from the application server. In some aspects, the network node may use an enhanced TSCAI to provide the nominal PDB, periodicity, and/or frequency to the network node (e.g., application function to network node). Alternatively, the UE may provide all of the traffic pattern information to the network node.

In some aspects, the network node may determine bursts of data packets using implicit burst packet grouping for the deadline (e.g., for a deadline KPI). In some aspects, the network node may need to identify which IP packets belong to the n-th burst (or PDU set). The UE may check the QoS flow of packets as to apply the deadline only for relevant QoS flows. Based at least in part on burst timing information (e.g., deadline, nominal PDB, periodicity, frequency), the network node may identify packets that are delivered within the following time period as part of the n-th burst:

$$n\text{-th deadline}-\text{nominal PDB}+n*\text{periodicity}+/-\text{periodicity}/2$$

N-th burst packets may be required to be delivered within the n-th deadline. For example, for a CN user plane function (UPF) solution, a CN UPF (e.g., the CN network node) marks the burst packets using a UPF. The CN UPF identifies the burst packets based at least in part on packet arrival timings in relation to UPF, and the CN UPF marks the burst in a GTP-U header. The CN UPF indicates the burst packets to the network node CU over an N3 (N3 frequency band) interface (e.g., using a GTP-U header). The network node CU indicates the burst packets to a network node DU over an F1-U interface (e.g., using a GTP-U header)

In some aspects, the network node may mark the burst packets using PDCP. The network node DU may identify the burst packets based at least in part on the packet arrival timings to the network node CU, and the DU or the CU may mark the burst in a GTP-U header. The network node CU indicates the burst packets to the network node DU over an F1-U interface (e.g., using a GTP-U header).

In some aspects, the network node DU may use a MAC layer indication to identify the burst packets by itself. The network node DU identifies the burst packets based at least in part on the packet arrival timings to network node DU by itself. The LCID indicates which packet flows are related to the deadline.

As shown by reference number 830, the UE may receive, and the network node may transmit, an indication of a downlink resources for receiving data packets of the QoS flow. In some aspects, the network node may schedule traffic for the data packets (e.g., XR traffic) based at least in part on the deadline. In some aspects, the network node may perform implicit burst packet grouping. For example, the network node may group data packets in to burst based at least in part on a deadline, a nominal PDB, a frequency, and/or a periodicity (e.g., deadline–nominal PDB+n*periodicity+/–periodicity/2).

In some aspects, the network node may schedule the data packets arriving during [deadline–nominal PDB+n*periodicity+/–periodicity/2] for transmission by deadline+n*periodicity. In some aspects, the network node may use [3GPP—burst packet] to implicitly group bursts of data packets (e.g., implicit burst packet grouping) for deadline KPI. In some aspects, data packets delivered within the periodicity and/or frequency is assumed as a set of burst packets.

As indicated above, FIG. 8 is provided as an example. Other examples may differ from what is described with regard to FIG. 8.

Figure 9:
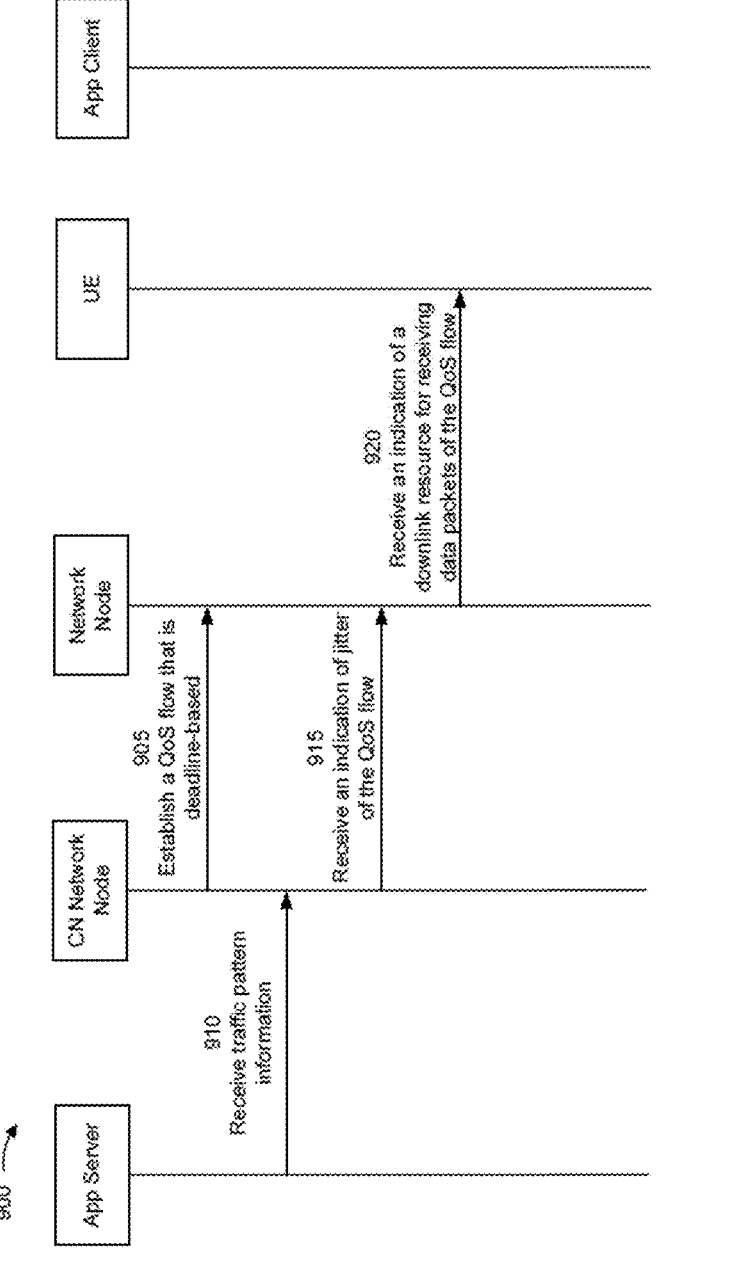

FIG. 9 is a diagram of an example 900 associated with deadline-based data packets, in accordance with the present disclosure. As shown in FIG. 9, multiple network nodes may communicate with a UE (e.g., UE 120). The multiple network nodes may include one or more base stations 110, one or more CUs, one or more DUs, one or more RUs, one or more core network nodes, one or more network servers, one or more application servers, and/or one or more AMFs, among other examples. In some aspects, the UE and a network node (e.g., a RAN network node) of the multiple network nodes may be part of a wireless network (e.g., wireless network 100). The UE and the network node may have established a wireless connection prior to operations shown in FIG. 9.

As shown by reference number 905, a CN network node and the network node may establish a QoS flow that is deadline-based. For example, the CN network node (e.g., the 5G core network) may set a new "QoS flow with deadline" in a PDU session. The QoS flow may define a deadline instead of a PDB.

For a QoS flow with a deadline, the UE may define its own deadline by indicating the timing to the network node, or the deadline may eventually converge to a nominal arrival time+nominal PDB. In some aspects, a 5G QoS flow table may include a new information element that indicate packet delivery requirement of 'deadline' instead of PDB. For example, the deadline may be defined with PDU set design parameters such as ADB and AER.

In some aspects, the CN network node may decide which IP flow is set for QoS flow with deadline (e.g., using PCF/SMF). In some aspects, the CN network node may indicate to the network node which QoS flow is set for deadline during a PDU session establishment. In some aspects, the CN network node may indicate to the UE which QoS flow is set for deadline with an NAS message. Additionally, or alternatively, the network node may indicate to the UE which LCID is set for deadline with an RRC message.

In some aspects, related information elements in a communication standard may be extended. For example, [CN to NAS] N11/N2 interfaces+F1/E1 interfaces (e.g. PDU session—QoS Parameters); [CN to UE] NAS messages (e.g. indicate QoS flow for deadline); and/or [gNB to UE] RRC messages (e.g. indicate LCID for deadline).

As shown by reference number 910, the CN network node may receive traffic pattern information from an application server. For example, an application function of the application server may provide XR traffic pattern information (e.g., periodicity, frequency, nominal PDB, nominalArrivalTime) to the CN network node. The application server may provide the XR traffic pattern information using an Nx interface to transmit an enhanced TSCAI or another message. Alternatively, the UE may provide the information to the network node. In some aspects, the CN network node and the network node may need to be synchronized to use the NominalArrivalTime to determine the deadline.

As shown by reference number 915, the network node may receive an indication of jitter of the QoS flow. In some aspects, the CN network node (e.g., using a user plane function) may mark jitter in a GTP-U header using metadata of a burst in an N3/F1 interface. For example, the GTP-U header may indicate jitter of a burst arrival time. In some aspects, the CN network node (e.g., the UPF) may mark the jitter of burst arrival time for each burst in the GTP-U header.

In some aspects, the CN UPF calculates the jitter of burst arrival time, and marks the GTU-U header with the jitter. In some aspects, the jitter of burst arrival time=Actual burst Arrival Time–Nominal Arrival Time. The CN UPF may indicate the jitter of burst arrival time to the network node CU over an N3 interface. The network node CU may indicate jitter information to the network node DU over an F1 interface.

The indication may be a new information element 'Jitter of burst Arrival Time' in the GTU-U header (N3/F1 interface). The CN UPF may provide the jitter of burst arrival time of a current burst (or PDU set) to the network node. To reduce an amount of information bits, the jitter may be digitized (e.g., mean square between (MSBs) of a jitter amount). A GTP-U may be extended to adopt an indication of a burst or PDU set (e.g., burst index, PDU set index), and the jitter information may be added on the top of the indication of the burst or PDU set.

In some aspects, the methods and systems described herein apply for one or more PDUs and/or PDU sets. PDU sets can be groups of packets carrying a single unit of information generated at the application layer.

In some aspects, the application server and the CN network node (e.g., the CN UPF) may need to be time-synchronized to calculate the jitter.

As shown by reference number 920, the UE may receive, and the network node may transmit, an indication of a downlink resource for receiving data packets of the QoS flow. In some aspects, the network node may use implicit burst packet grouping to correlate bursts with the deadline and/or occasions of the deadline.

In some aspects, the network node may schedule the downlink resource based at least in part on a deadline associated with data packets. For example, data packets arriving during [deadline−nominal PDB+n*periodicity+−periodicity/2] should be delivered by deadline+ n*periodicity. Additionally, or alternatively, the network node may perform implicit burst packet grouping based at least in part on arrival times of the data packets.

As indicated above, FIG. 9 is provided as an example. Other examples may differ from what is described with regard to FIG. 9.

Figure 10:
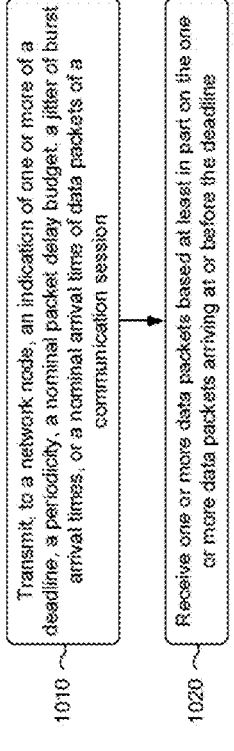

FIG. 10 is a diagram illustrating an example process 1000 performed, for example, by a UE, in accordance with the present disclosure. Example process 1000 is an example where the UE (e.g., UE 120) performs operations associated with deadline-based data packets.

As shown in FIG. 10, in some aspects, process 1000 may include transmitting, to a network node, an indication of one or more of a deadline, a periodicity, a frequency, a nominal packet delay budget, a jitter of burst arrival times, or a nominal arrival time of data packets of a communication session (block 1010). For example, the UE (e.g., using communication manager 140 and/or transmission component 1304, depicted in FIG. 13) may transmit, to a network node, an indication of one or more of a deadline, a periodicity, a frequency, a nominal packet delay budget, a jitter of burst arrival times, or a nominal arrival time of data packets of a communication session, as described above.

As further shown in FIG. 10, in some aspects, process 1000 may include receiving one or more data packets based at least in part on the one or more data packets arriving at or before the deadline (block 1020). For example, the UE (e.g., using communication manager 140 and/or reception component 1302, depicted in FIG. 13) may receive one or more data packets based at least in part on the one or more data packets arriving at or before the deadline, as described above.

Process 1000 may include additional aspects, such as any single aspect or any combination of aspects described below and/or in connection with one or more other processes described elsewhere herein.

In a first aspect, process 1000 includes receiving, from an application client at the UE, information indicating the deadline, the periodicity, the frequency, the nominal packet delay budget, the jitter of burst arrival times, or the nominal arrival time of data packets of the communication session.

In a second aspect, individually or in combination with the first aspect, process 1000 includes converting the deadline into a radio access network (RAN) time domain to create a converted deadline, the deadline indicated by the indication being the converted deadline.

In a third aspect, individually or in combination with one or more of the first and second aspects, converting the deadline into a RAN time domain comprises converting the deadline from an application time domain to the RAN time domain based at least in part on one or more of deadline mapping associated with a QoS flow, one or more deadline notification messages, or one or more DRB QoS parameters associated with the deadline.

In a fourth aspect, individually or in combination with one or more of the first through third aspects, process 1000 includes identifying a burst index of the data packets based at least in part on one or more of bursting metadata available at an application layer of the data packets, or a determined burst index based at least in part on timing of the data packets, wherein the deadline is a periodic deadline, and wherein the burst index is associated with an occasion of the deadline.

In a fifth aspect, individually or in combination with one or more of the first through fourth aspects, process 1000 includes identifying an IP flow to which the deadline applies, the IP flow being associated with the data packets (e.g., the UE receives the data packets via the IP flow) and identified based at least in part on one or more of an indication of the IP flow via an application layer of the data packets, or a determined logical channel identification based at least in part on an IP packet index of the data packets.

In a sixth aspect, individually or in combination with one or more of the first through fifth aspects, process 1000 includes translating the IP flow into a QoS flow to which the deadline applies.

In a seventh aspect, individually or in combination with one or more of the first through sixth aspects, process 1000 includes transmitting one or more of an indication that a QoS flow or logical channel associated with the data packets is associated with the deadline, an indication of a burst index associated with an occasion of the deadline, or an indication that a logical channel identification associated with the data packets is associated with the deadline.

In an eighth aspect, individually or in combination with one or more of the first through seventh aspects, process 1000 includes receiving an additional indication that the QoS flow or logical channel is configured with the deadline and transmitting an indication that the QoS flow or logical channel associated with the data packets is associated with the deadline.

In a ninth aspect, individually or in combination with one or more of the first through eighth aspects, process 1000 includes receiving an indication that expiration of the data packets of the communication session is associated with the deadline and is not associated with a packet delay budget or transmitting an indication that expiration of the data packets of the communication session is associated with the deadline and is not associated with a packet delay budget.

In a tenth aspect, individually or in combination with one or more of the first through ninth aspects, process 1000 includes receiving an indication of acceptance of the deadline, the periodicity, the frequency, the nominal packet delay budget, the jitter of burst arrival times, or the nominal arrival time of data packets of the communication session.

In an eleventh aspect, individually or in combination with one or more of the first through tenth aspects, transmitting the indication of one or more of the deadline, the periodicity, the frequency, the nominal packet delay budget, the jitter of burst arrival times, or the nominal arrival time of data packets of the communication session comprises transmitting the indication via a RRC message, transmitting the indication via a MAC-CE, or transmitting the indication via an application layer indication.

In a twelfth aspect, individually or in combination with one or more of the first through eleventh aspects, the deadline is associated with a periodic display time and a UE internal data processing time.

In a thirteenth aspect, individually or in combination with one or more of the first through twelfth aspects, process 1000 includes receiving an indication of a downlink resource for receiving the data packets, the downlink resource based at least in part on the indication of the deadline, the periodicity, the frequency, the nominal packet delay budget, the jitter of burst arrival times, or the nominal arrival time of data packets of the communication session, wherein the data packets are received based on the downlink resource.

In a fourteenth aspect, individually or in combination with one or more of the first through thirteenth aspects, process 1000 includes receiving an indication of a mapping of QoS flows to IP flows, wherein transmitting the indication of the deadline, the periodicity, the frequency, the nominal packet delay budget, the jitter of burst arrival times, or the nominal arrival time comprises transmitting, based at least in part on the mapping of the QoS flows to the IP flows, an additional indication that a QoS flow is associated with the deadline, the periodicity, the frequency, the nominal packet delay budget, the jitter of burst arrival times, or the nominal arrival time.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
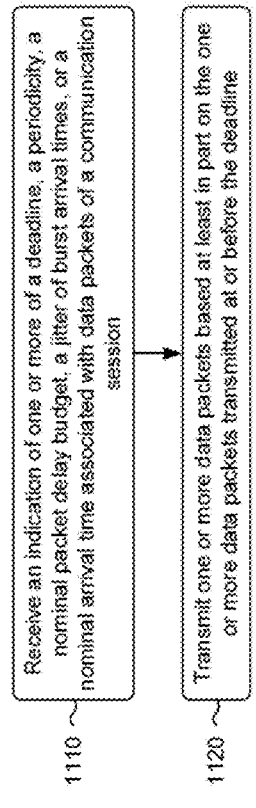

FIG. 11 is a diagram illustrating an example process 1100 performed, for example, by a network node, in accordance with the present disclosure. Example process 1100 is an example where the network node (e.g., a base station, a CU, a DU, and/or an RU) performs operations associated with deadline-based data packets.

As shown in FIG. 11, in some aspects, process 1100 may include receiving an indication of one or more of a deadline, a periodicity, a frequency, a nominal packet delay budget, a jitter of burst arrival times, or a nominal arrival time associated with data packets of a communication session (block 1110). For example, the network node (e.g., using communication manager 150 and/or reception component 1402, depicted in FIG. 14) may receive an indication of one or more of a deadline, a periodicity, a frequency, a nominal packet delay budget, a jitter of burst arrival times, or a nominal arrival time associated with data packets of a communication session, as described above.

As further shown in FIG. 11, in some aspects, process 1100 may include transmitting one or more data packets based at least in part on the one or more data packets transmitted at or before the deadline (block 1120). For example, the network node (e.g., using communication manager 150 and/or transmission component 1404, depicted in FIG. 14) may transmit one or more data packets based at least in part on the one or more data packets transmitted at or before the deadline, as described above.

Process 1100 may include additional aspects, such as any single aspect or any combination of aspects described below and/or in connection with one or more other processes described elsewhere herein.

In a first aspect, receiving the indication comprising one or more or receiving, from a UE associated with the data packets, information indicating one or more of the deadline, the periodicity, the nominal packet delay budget, the jitter of burst arrival times, or the nominal arrival time of data packets of the communication session, or receiving, from an application server associated with the data packets, information indicating the deadline, the periodicity, the frequency, the nominal packet delay budget, the jitter of burst arrival times, or the nominal arrival time of data packets of the communication session.

In a second aspect, individually or in combination with the first aspect, receiving the indication of one or more of the deadline, a periodicity, a frequency, a nominal packet delay budget, the jitter of burst arrival times, or the nominal arrival time of data packets of the communication session comprises receiving the indication via a RRC message, receiving the indication via a MAC-CE, or receiving the indication via an application layer indication.

In a third aspect, individually or in combination with one or more of the first and second aspects, the deadline is associated with a periodic display time and a UE internal data processing time.

In a fourth aspect, individually or in combination with one or more of the first through third aspects, process 1100 includes transmitting an indication of a downlink resource for receiving the data packets, the downlink resource based at least in part on the indication of the deadline, a periodicity, a frequency, a nominal packet delay budget, the jitter of burst arrival times, or the nominal arrival time of data packets of the communication session, wherein the data packets are received by a receiving device based at least in part on the downlink resources.

In a fifth aspect, individually or in combination with one or more of the first through fourth aspects, process 1100 includes grouping data packets into a burst group based at least in part on the indication of the deadline, a periodicity, a frequency, a nominal packet delay budget, the jitter of burst arrival times, or the nominal arrival time of data packets of the communication session.

In a sixth aspect, individually or in combination with one or more of the first through fifth aspects, process 1100 includes receiving one or more of an indication that a QoS flow or logical channel associated with the data packets is associated with the deadline, an indication of a burst index associated an occasion of the deadline, or an indication that a logical channel identification associated with the data packets is associated with the deadline.

In a seventh aspect, individually or in combination with one or more of the first through sixth aspects, process 1100 includes transmitting an additional indication that the QoS flow or logical channel is configured with the deadline based at least in part on receiving the indication that the QoS flow or logical channel associated with the data packets is associated with the deadline.

In an eighth aspect, individually or in combination with one or more of the first through seventh aspects, process 1100 includes transmitting an indication of a mapping of QoS flows to IP flows for translating an IP flow to which the deadline applies into a QoS flow to which the deadline applies.

In a ninth aspect, individually or in combination with one or more of the first through eighth aspects, process 1100 includes transmitting an indication of acceptance of the deadline, the periodicity, the frequency, the nominal packet delay budget, the jitter of burst arrival times, or the nominal arrival time of data packets of the communication session.

In a tenth aspect, individually or in combination with one or more of the first through ninth aspects, receiving the indication of the deadline comprises receiving the indication of the deadline via a centralized unit, and wherein the network node comprises a distributed unit.

In an eleventh aspect, individually or in combination with one or more of the first through tenth aspects, transmitting the one or more data packets comprises identifying a QoS flow associated with the data packets, applying the deadline to the data packets based at least in part on the QoS flow being associated with the deadline, and applying a periodic occasion of the deadline to the data packets based at least in part on a time at which the network node receives the data packets or an indication of a burst number of the data packets.

In a twelfth aspect, individually or in combination with one or more of the first through eleventh aspects, receiving the jitter of burst arrival times comprises receiving an indication of the jitter of burst arrival times in a user plane header.

In a thirteenth aspect, individually or in combination with one or more of the first through twelfth aspects, the jitter of burst arrival times is based at least in part on an actual burst arrival times and a nominal arrival time.

In a fourteenth aspect, individually or in combination with one or more of the first through thirteenth aspects, process 1100 includes receiving an indication that expiration of the data packets of the communication session is associated with the deadline and is not associated with a packet delay budget or transmitting an indication that expiration of the data packets of the communication session is associated with the deadline and is not associated with a packet delay budget.

In a fifteenth aspect, individually or in combination with one or more of the first through fourteenth aspects, process 1100 includes dropping one or more additional data packets based at least in part on the one or more additional data packets failing to satisfy the deadline.

In a sixteenth aspect, individually or in combination with one or more of the first through fifteenth aspects, process 1100 includes identifying the deadline based at least in part on one or more of the periodicity, the frequency, the nominal packet delay budget, the jitter of burst arrival times, or the nominal arrival time of data packets.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12A is diagram illustrating an example process 1200A performed, for example, by a UE and a client application executing (e.g., hosted) thereon and performed by the network node, in accordance with the present disclosure. Example process 1200 is an example where the UE (e.g., UE 120d), an associated client application (e.g., an XR application), and the network node performs operations associated with deadline-based data packets.

As shown in FIG. 12A, in some aspects, process 1200A may include transmitting, by a UE and to a network node, an indication of a data delivery deadline for data traffic to be received by the network node, wherein the data delivery deadline indicates by when the network node is to deliver one or more data packets received from the user equipment (block 1210A). For example, the UE (e.g., using communication manager 1308 and/or transmission component 1304, depicted in FIG. 13) may be configured to transmit the indication of a data delivery deadline to the network node. As further shown in FIG. 12A, in some aspects, process 1200A may include transmitting, by the UE to the network node, the one or more data packets (block 1220A), which may also be performed by UE (e.g., using communication manager 1308 and/or transmission component 1304, depicted in FIG. 13).

Furthermore, process 1200A may also include receiving, by the network node, the indication of the data delivery deadline and the one or more data packets from the UE (block 1230A). For example, the network node (e.g., using reception component 1402, depicted in FIG. 14) may receive the indication of the data delivery deadline and the one or more data packets from the UE. In an exemplary aspect, the data delivery deadline is received first and then the UE begin transmitting data packets or bursts to the network node. In response thereto, process 1200A can further include transmitting, by the network node, the one or more data packets from the user equipment at a time between an actual arrival time of the one or more data packets from the user equipment and the data delivery deadline (block 1240A). For example, the network node (e.g., using communication manager 1408 and/or transmission component 1404, depicted in FIG. 14) may transmit the one or more data packets from the user equipment to an upstream device, such as a server, for example.

FIG. 12B is diagram illustrating another example process 1200B performed, for example, by the UE and the client application executing (e.g., hosted) thereon and performed by the network node, in accordance with the present disclosure. Again, it should be appreciated that example process 1200B is an example where the UE (e.g., UE 120d) and an associated client application (e.g., an XR application), and the network node, performs operations associated with deadline-based data packets. Process 12008 can be an alternative to process 1200A. Yet further, the UE (e.g., UE 120d) and corresponding network node can each be configured to perform either of the respective subprocesses based on an exemplary configuration.

Specifically, as shown in FIG. 12B, in some aspects, process 1200B may include transmitting, to by a UE a network node, an indication of a nominal arrival time for the data traffic to be received at the network node, wherein the nominal arrival time in combination with a nominal delay budget indicates by when the network node is to transmit the one or more data packets received from the user equipment (block 1210B). For example, the UE (e.g., using communication manager 1308 and/or transmission component 1304, depicted in FIG. 13) may be configured to transmit the nominal arrival time for the data traffic to be received at the network node. As further shown in FIG. 12B, in some aspects, process 1200B may include transmitting, by the UE to the network node, the one or more data packets (block 12208), which may also be performed by UE (e.g., using communication manager 1308 and/or transmission component 1304, depicted in FIG. 13).

Furthermore, process 1200B may also include receiving, by the network node, the indication of the nominal arrival time and the one or more data packets from the UE (block 1230B). For example, the network node (e.g., using reception component 1402, depicted in FIG. 14) may receive the indication of the nominal arrival time and the one or more data packets from the UE. In an exemplary aspect, the nominal arrival time is received first and then the UE begin transmitting data packets or bursts to the network node. In response thereto, process 1200B can further include transmitting, by the network node, the one or more data packets from the user equipment at a time between an actual arrival time of the one or more data packets from the user equipment and a second time based at least in part on the nominal arrival time and the nominal delay budget (block 1240B). For example, the network node (e.g., using communication manager 1408 and/or transmission component 1404, depicted in FIG. 14) may transmit the one or more data packets from the user equipment to an upstream device, such as a server, for example.

Processes 1200A and 1200B may include additional aspects, such as any single aspect or any combination of aspects described below and/or in connection with one or more other processes described elsewhere herein.

In a first aspect, process 1200A and/or process 1200B includes transmitting, to the network node, an indication of a periodicity or a frequency of the nominal arrival time for the network node to transmit the one or more data packets from the UE.

In a second aspect, individually or in combination with the first aspect, process 1200A and/or process 1200B includes defining the nominal arrival time for the network node to be independent from when the network node receives the one more data packets from the UE.

In a third aspect, individually or in combination with one or more of the first and second aspects, process 1200A and/or process 1200B includes overriding the data delivery deadline packet data buffer set from an actual arrival time of the one more data packets from the UE.

In a fourth aspect, individually or in combination with one or more of the first through third aspects, process 1200A and/or process 1200B includes dynamically adjusting, by the client application, the data delivery deadline for the data traffic based on a quality of service (QoS) flow for the data to be delivered to the network node.

In a fifth aspect, individually or in combination with one or more of the first through fourth aspects, process 1200A and/or process 1200B includes determining, by the client application, the nominal arrival time based on a timing when the client application generates the one or more data packets.

In a sixth aspect, individually or in combination with one or more of the first through fifth aspects, process 1200A and/or process 1200B includes providing, by the client application hosted on the UE, the data delivery deadline to the UE with a cross-layer application programming interface and based on uplink traffic received from a server coupled to the network node.

In a seventh aspect, individually or in combination with one or more of the first through sixth aspects, process 1200A and/or process 1200B includes receiving, by the client application, a relative time offset of uplink timing to meet the data delivery deadline; and determining the data delivery deadline based on the relative time offset.

In an eighth aspect, individually or in combination with one or more of the first through seventh aspects, process 1200A and/or process 1200B includes determining of the nominal arrival time for the data traffic comprises calculating, by the UE, the nominal arrival time based on incoming data packets received from the client application and adjusting the nominal arrival time based on a timing of the received incoming data packets.

In a ninth aspect, individually or in combination with one or more of the first through eighth aspects, process 1200A and/or process 1200B includes marking a jitter or delay budget in a header of each of the data packets delivered by the client application to the UE; and adjusting the nominal arrival time based on the timing indicated by the jitter or the delay budget in the header of each of the data packets.

In a tenth aspect, individually or in combination with one or more of the first through ninth aspects, process 1200A and/or process 1200B includes converting the data delivery deadline into a radio access network (RAN) time domain to create a converted deadline for the network node.

In an eleventh aspect, individually or in combination with one or more of the first through tenth aspects, process 1200A and/or process 1200B includes converting the data delivery deadline into a RAN time domain comprises converting the deadline from an application time domain to the RAN time domain based at least in part on one or more of deadline mapping associated with a quality of service (QoS) flow, one or more deadline notification messages, or one or more data radio bearer (DRB) QoS parameters associated with the deadline.

In a twelfth aspect, individually or in combination with one or more of the first through eleventh aspects, process 1200A and/or process 1200B includes transmitting the indication of the data delivery deadline for the data traffic to be delivered by the network node.

In a thirteenth aspect, individually or in combination with one or more of the first through twelfth aspects, process 1200A and/or process 1200B includes transmitting to the network node comprises transmitting the indication of the nominal arrival time for the data traffic to be received at the network node.

In a fourteenth aspect, individually or in combination with one or more of the first through thirteenth aspects, process 1200A and/or process 1200B includes estimating the data delivery deadline of a subsequent one or more data packets by adding the periodicity to a current data delivery deadline.

In a fifteenth aspect, individually or in combination with one or more of the first through fourteenth aspects, process 1200A and/or process 1200B includes estimating additional time consumed by a retransmission of the one or more data packets uplink packets.

Although FIGS. 12A and 12B show example blocks of processes 1200A and 1200B, in some aspects, these processes 1200A and 1200B may include additional blocks, fewer blocks, different blocks, or differently arranged blocks than those depicted in FIGS. 12A and 12B. Additionally, or alternatively, two or more of the blocks of each of processes 1200A and 1200B may be performed in parallel.

Figure 13:
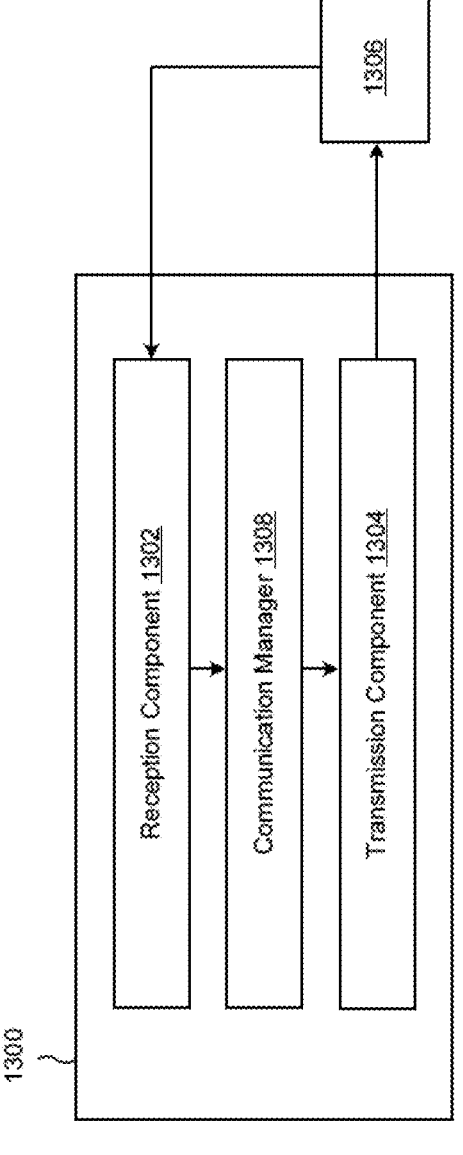
FIGS. 13 and 14 are diagrams of example apparatuses for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a communication manager 1308 (e.g., the communication manager 140).

In some aspects, the apparatus 1300 may be configured to perform one or more operations described herein in connection with FIGS. 6-9. Additionally, or alternatively, the apparatus 1300 may be configured to perform one or more processes described herein, such as process 1000 of FIG. 10, process 1200A of FIGS. 12A and 1200B of FIG. 12B. Additionally, or alternatively, the apparatus 1300 may be configured to perform one or more operations described herein in connection with FIGS. 15-21. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in non-transitory computer-readable media, individually or in combination, and executable by a controller or one or more processors, individually or in combination, to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, one or more receive processors, one or more controllers/processors, one or more memories, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, one or more transmit MIMO processors, one or more transmit processors, one or more controllers/processors, one or more memories, or a combination thereof, of the UE described in connection with FIG. 2. In some aspects, the transmission component 1304 may be co-located with the reception component 1302 in a transceiver.

The transmission component 1304 may transmit, to a network node, an indication of one or more of a deadline, a periodicity, a frequency, a nominal packet delay budget, a jitter of burst arrival times, or a nominal arrival time of data packets of a communication session. The reception component 1302 may receive one or more data packets based at least in part on the one or more data packets arriving at or before the deadline.

The reception component 1302 may receive, from an application client at the UE, information indicating the deadline, the periodicity, the frequency, the nominal packet delay budget, the jitter of burst arrival times, or the nominal arrival time of data packets of the communication session.

The communication manager 1308 may convert the deadline into a RAN time domain to create a converted deadline the deadline indicated by the indication being the converted deadline.

The communication manager 1308 may identify a burst index of the data packets based at least in part on one or more of burst metadata available at an application layer of the data packets, or a determined burst index based at least in part on timing of the data packets, wherein the deadline is a periodic deadline, and wherein the burst index is associated with an occasion of the deadline.

The communication manager 1308 may identify an IP flow to which the deadline applies, the IP flow being associated with the data packets and identified based at least in part on one or more of an indication of the IP flow via an application layer of the data packets, or a determined logical channel identification based at least in part on an IP packet index of the data packets.

The communication manager 1308 may translate the IP flow into a QoS flow to which the deadline applies.

The transmission component 1304 may transmit one or more of an indication that a QoS flow or logical channel associated with the data packets is associated with the deadline, an indication of a burst index associated with an occasion of the deadline, or an indication that a logical channel identification associated with the data packets is associated with the deadline.

The reception component 1302 may receive an additional indication that the QoS flow or logical channel is configured with the deadline and transmitting an indication that the QoS flow or logical channel associated with the data packets is associated with the deadline.

The reception component 1302 may receive an indication that expiration of the data packets of the communication session is associated with the deadline and is not associated with a packet delay budget.

The transmission component 1304 may transmit an indication that expiration of the data packets of the communication session is associated with the deadline and is not associated with a packet delay budget.

The reception component 1302 may receive an indication of acceptance of the deadline, the periodicity, the frequency, the nominal packet delay budget, the jitter of burst arrival times, or the nominal arrival time of data packets of the communication session.

The reception component 1302 may receive an indication of a downlink resource for receiving the data packets, the downlink resource based at least in part on the indication of the deadline, the periodicity, the frequency, the nominal packet delay budget, the jitter of burst arrival times, or the nominal arrival time of data packets of the communication session wherein the data packets are received based on the downlink resource.

The reception component 1302 may receive an indication of a mapping of QoS flows to IP flows.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
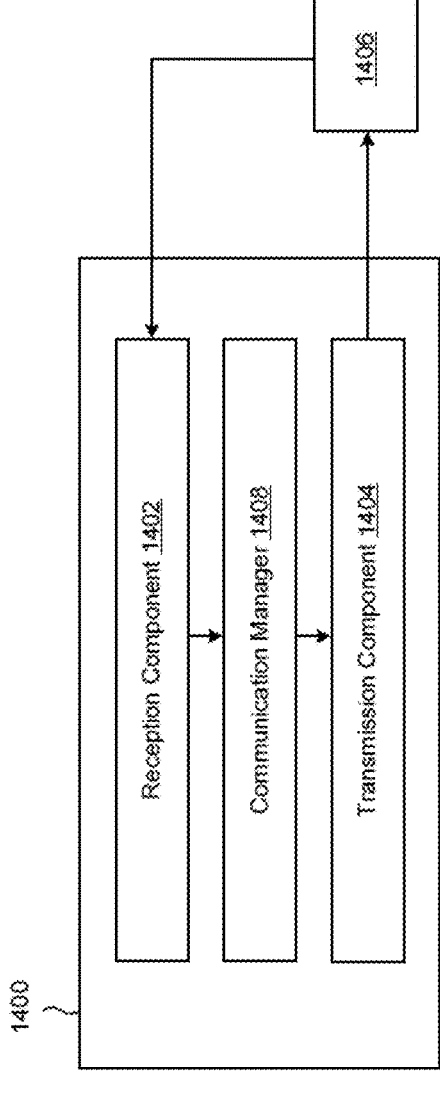

FIG. 14 is a diagram of an example apparatus 1400 for wireless communication. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a communication manager (e.g., the communication manager 150).

In some aspects, the apparatus 1400 may be configured to perform one or more operations described herein in connection with FIGS. 6-9. Additionally, or alternatively, the apparatus 1400 may be configured to perform one or more processes described herein, such as process 1100 of FIG. 11, process 1200A of FIGS. 12A and 1200B of FIG. 12B. Additionally, or alternatively, the apparatus 1400 may be configured to perform one or more operations described herein in connection with FIGS. 15-21. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in non-transitory computer-readable media, individually or in combination, and executable by one or more controllers and/or processors, individually or in combination, to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, one or more receive processors, one or more controllers/processors, one or more memories, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, one or more transmit MIMO processors, one or more transmit processors, one or more controllers/processors, one or more memories, or a combination thereof, of the network node described in connection with FIG. 2. In some aspects, the transmission component 1404 may be co-located with the reception component 1402 in a transceiver.

The reception component 1402 may receive an indication of one or more of a deadline, a periodicity, a frequency, a nominal packet delay budget, a jitter of burst arrival times, or a nominal arrival time associated with data packets of a communication session. The transmission component 1404 may transmit one or more data packets based at least in part on the one or more data packets transmitted at or before the deadline.

The transmission component 1404 may transmit an indication of a downlink resource for receiving the data packets, the downlink resource based at least in part on the indication of the deadline, a periodicity, a frequency, a nominal packet delay budget, the jitter of burst arrival times, or the nominal arrival time of data packets of the communication session wherein the data packets are received by a receiving device based at least in part on the downlink resources.

The communication manager 1408 may group data packets into a burst group based at least in part on the indication of the deadline, a periodicity, a frequency, a nominal packet delay budget, the jitter of burst arrival times, or the nominal arrival time of data packets of the communication session.

The reception component 1402 may receive one or more of an indication that a QoS flow or logical channel associated with the data packets is associated with the deadline, an indication of a burst index associated an occasion of the deadline, or an indication that a logical channel identification associated with the data packets is associated with the deadline.

The transmission component 1404 may transmit an additional indication that the QoS flow or logical channel is configured with the deadline based at least in part on receiving the indication that the QoS flow or logical channel associated with the data packets is associated with the deadline.

The transmission component 1404 may transmit an indication of a mapping of QoS flows to IP flows for translating an IP flow to which the deadline applies into a QoS flow to which the deadline applies.

The transmission component 1404 may transmit an indication of acceptance of the deadline, the periodicity, the frequency, the nominal packet delay budget, the jitter of burst arrival times, or the nominal arrival time of data packets of the communication session.

The reception component 1402 may receive an indication that expiration of the data packets of the communication session is associated with the deadline and is not associated with a packet delay budget.

The transmission component 1404 may transmit an indication that expiration of the data packets of the communication session is associated with the deadline and is not associated with a packet delay budget.

The communication manager 1408 may drop one or more additional data packets based at least in part on the one or more additional data packets failing to satisfy the deadline.

The communication manager 1408 may identify the deadline based at least in part on one or more of the periodicity, the frequency, the nominal packet delay budget, the jitter of burst arrival times, or the nominal arrival time of data packets.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
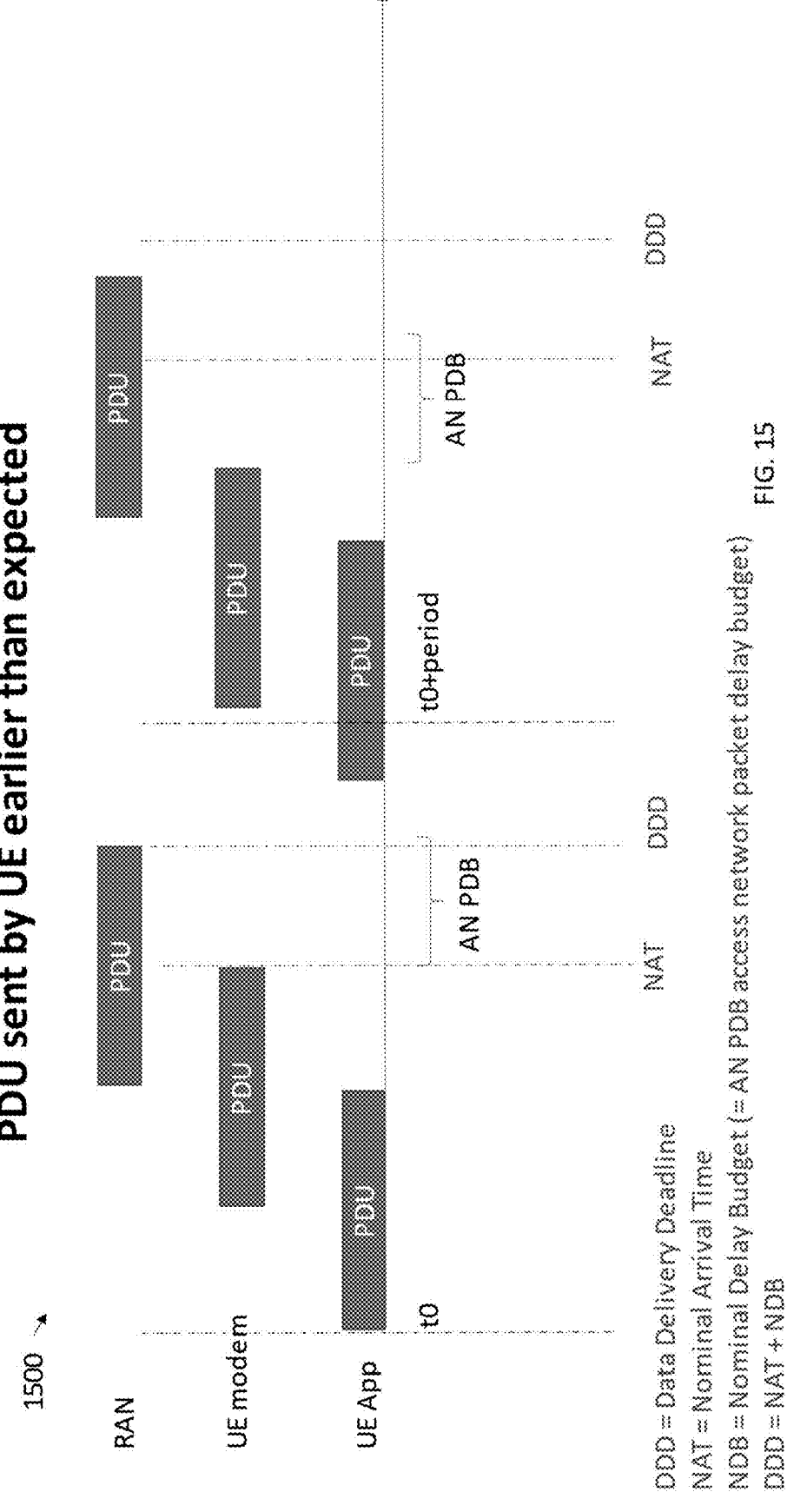
FIG. 15 is a diagram illustrating an example of operation when a protocol data unit (PDU) is transmitted by a UE earlier than expected.

FIG. 15 is a diagram illustrating an example 1500 of operation when a PDU is transmitted by a UE earlier than expected. As shown in example 1500, a UE app can transmit at time t0. A UE modem (e.g., one or more of 254a-254r, individually or in combination) can transmit the PDU such that it is sent by a nominal arrival time (NAT). RAN can transmit the PDU such that it is sent by a data delivery deadline (DDD). The DDD can be a sum of the nominal arrival time (NAT) and the nominal delay budget (NDB). In some aspects, the NDB can be equivalent to an access network packet delay budget (AN PDB).

Subsequently, the UE app would be expected to transmit the PDU at an expected time (e.g., t0+period). As such, an expected NAT would be NAT+period and an expected DDD would be DDD+period. However, in some aspects, the UE app can transmit the PDU earlier than expected, at a time before the expected transmission time (e.g., at a time before than t0+period). UE modem can then transmit the PDU earlier than expected, such that it arrives before the expected NAT. RAN can then transmit the PDU earlier than expected, such that it arrives before the expected DDD.

As indicated above, FIG. 15 is provided as an example. Other examples may differ from what is described with regard to FIG. 15.

Figure 16:
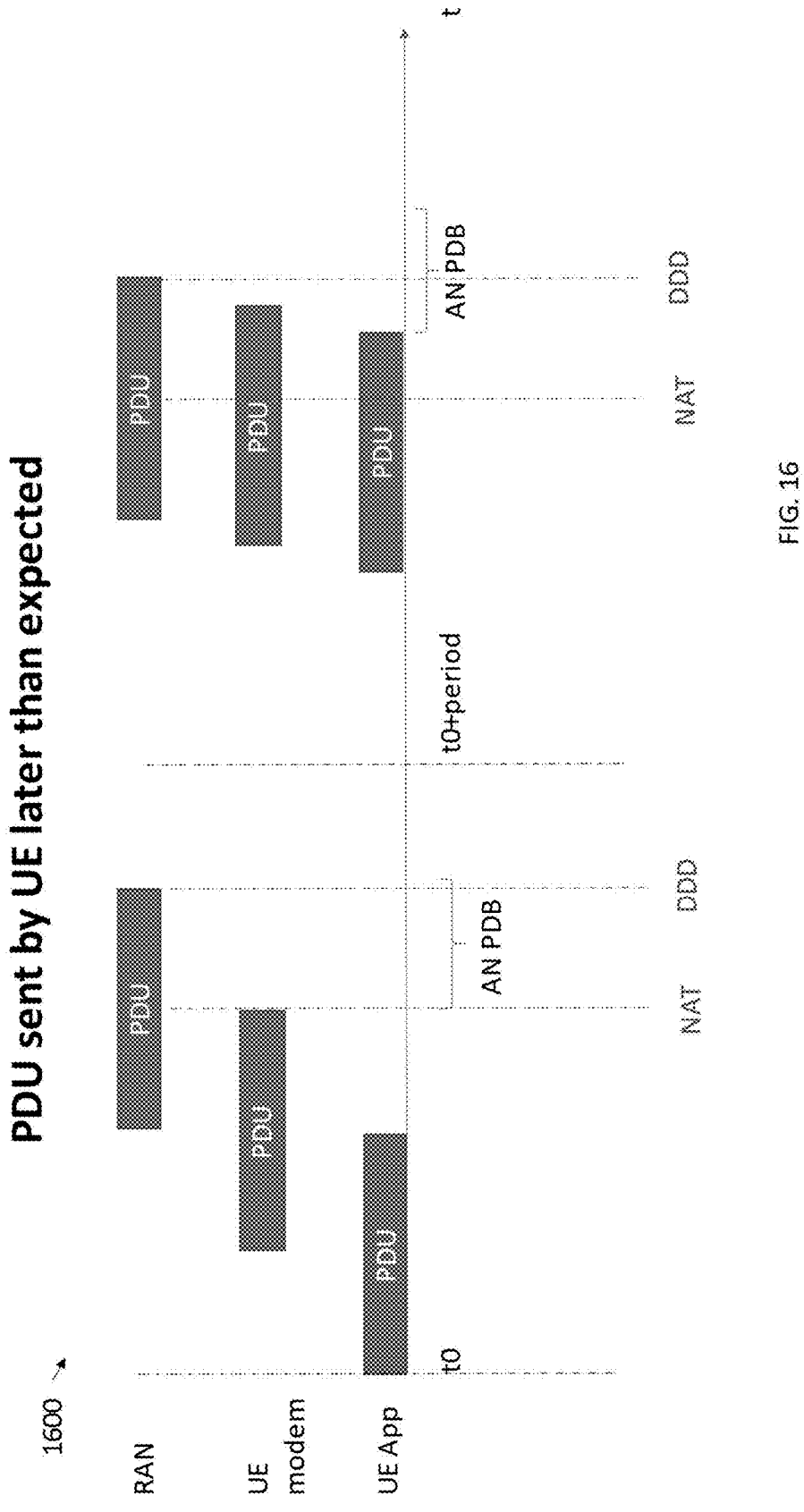
FIG. 16 is a diagram illustrating an example of operation when a PDU is transmitted by a UE later than expected.

FIG. 16 is a diagram illustrating an example 1600 of operation when a PDU is transmitted by a UE later than expected. As shown in example 1500, a UE app can transmit at time t0. A UE modem (e.g., one or more of 254a-254r, individually or in combination) can transmit the PDU such that it is sent by a nominal arrival time (NAT). RAN can transmit the PDU such that it is sent by a data delivery deadline (DDD). The DDD can be a sum of the nominal arrival time (NAT) and the nominal delay budget (NDB). In some aspects, the NDB can be equivalent to an access network packet delay budget (AN PDB).

Subsequently, the UE app would be expected to transmit the PDU at an expected time (e.g., t0+period). As such, an expected NAT would be NAT+period and an expected DDD would be DDD+period. However, in some aspects, the UE app can transmit the PDU later than expected, at a time later the expected transmission time (e.g., at a time later than t0+period). UE modem can then transmit the PDU later than expected, such that it arrives later the expected NAT. However, RAN may still be required to transmit the PDU by the expected DDD.

As indicated above, FIG. 16 is provided as an example. Other examples may differ from what is described with regard to FIG. 16.

Figure 17:
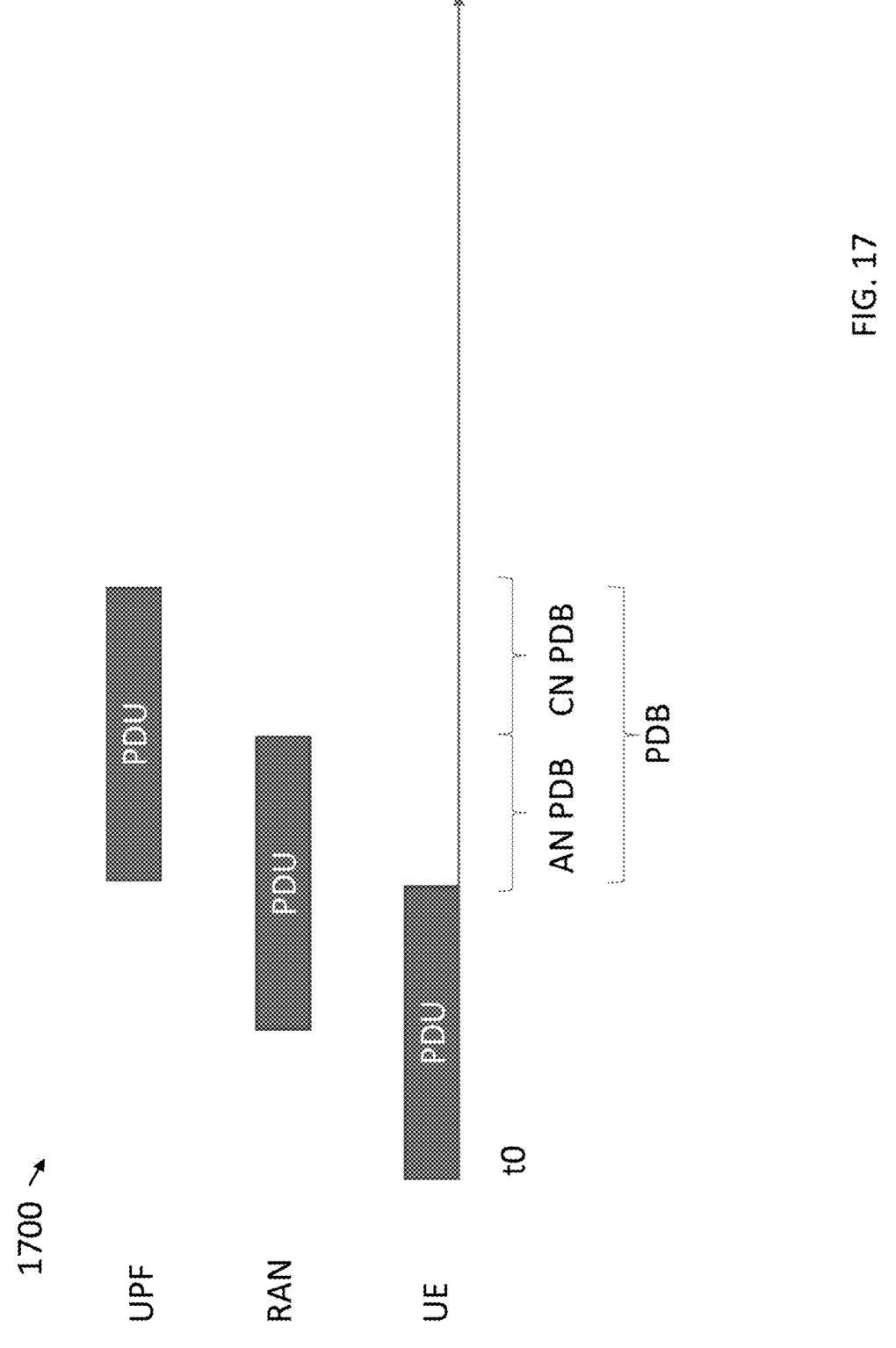
FIG. 17 is a diagram illustrating an example of operation when a PDU is transmitted by a UE.

FIG. 17 is a diagram illustrating an example 1700 of operation of transmitting a PDU by a UE. As shown in example 1700, a UE app can transmit at time t0. RAN can transmit the PDU such that it is sent by an AN PDB. UPF can transmit the PDU such that it is sent by CN PDB. In some aspects, a total PDB can be a sum of AN PDB and CN PDB.

As indicated above, FIG. 17 is provided as an example. Other examples may differ from what is described with regard to FIG. 17.

Figure 18:
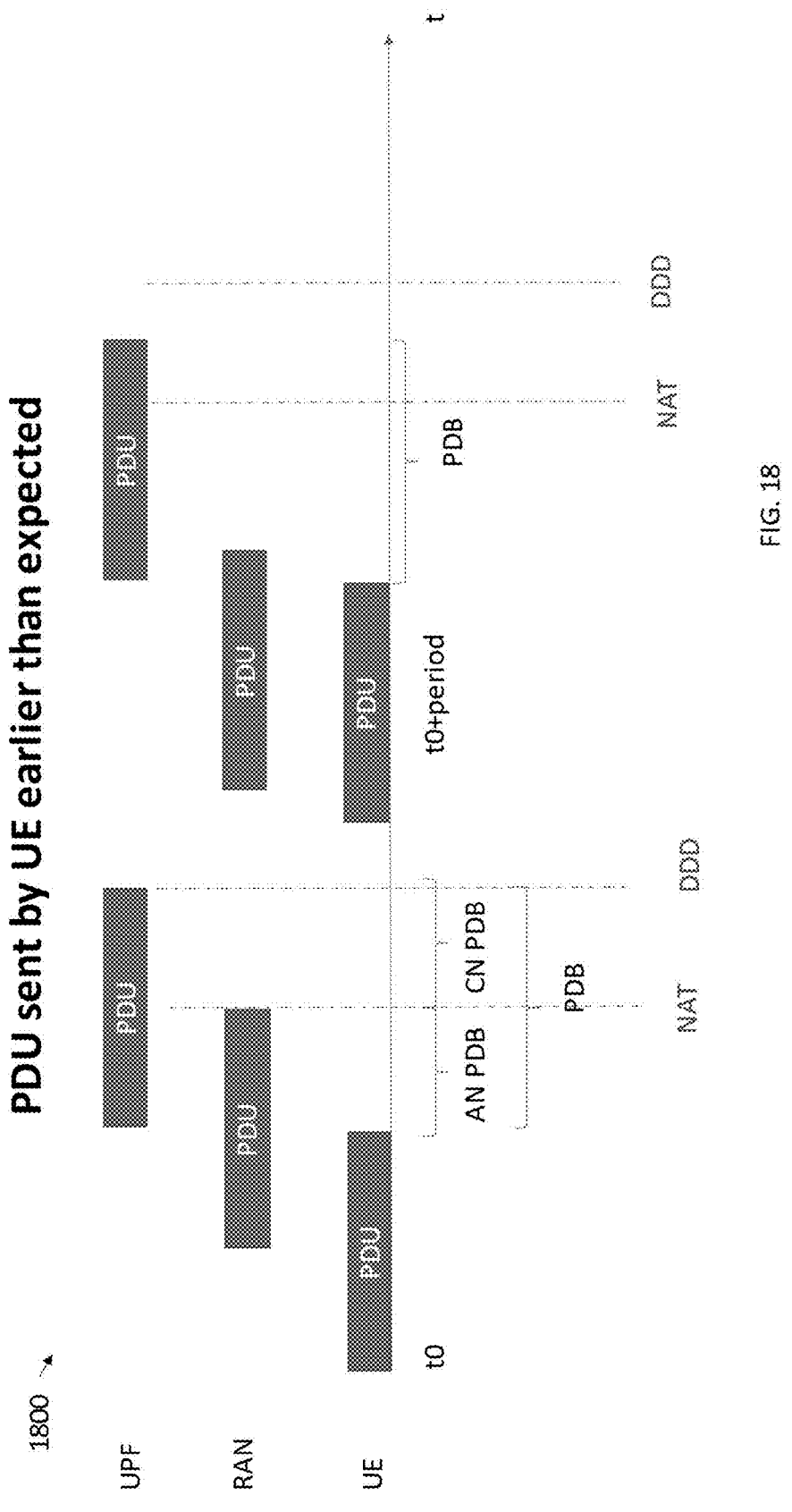
FIG. 18 is a diagram illustrating an example of operation when a PDU is transmitted by a UE earlier than expected.

FIG. 18 is a diagram illustrating an example 1800 of operation when a PDU is transmitted by a UE earlier than expected. As shown in example 1800, a UE can transmit at time t0. RAN can transmit the PDU such that it is sent by an AN PDB and a NAT. In some aspects, the NDB can be equivalent to an access network packet delay budget (AN PDB). UPF can transmit the PDU such that it is sent by CN PDB and a DDD. In some aspects, a total PDB can be a sum of AN PDB and CN PDB.

Subsequently, the UE would be expected to transmit the PDU at an expected time (e.g., t0+period). As such, an expected NAT would be NAT+period and an expected DDD would be DDD+period. However, in some aspects, the UE can transmit the PDU earlier than expected, at a time before the expected transmission time (e.g., at a time before than t0+period). RAN can then transmit the PDU earlier than expected, such that it arrives before the expected NAT. UPF can then transmit the PDU earlier than expected, such that it arrives before the expected DDD.

As indicated above, FIG. 18 is provided as an example. Other examples may differ from what is described with regard to FIG. 18.

Figure 19:
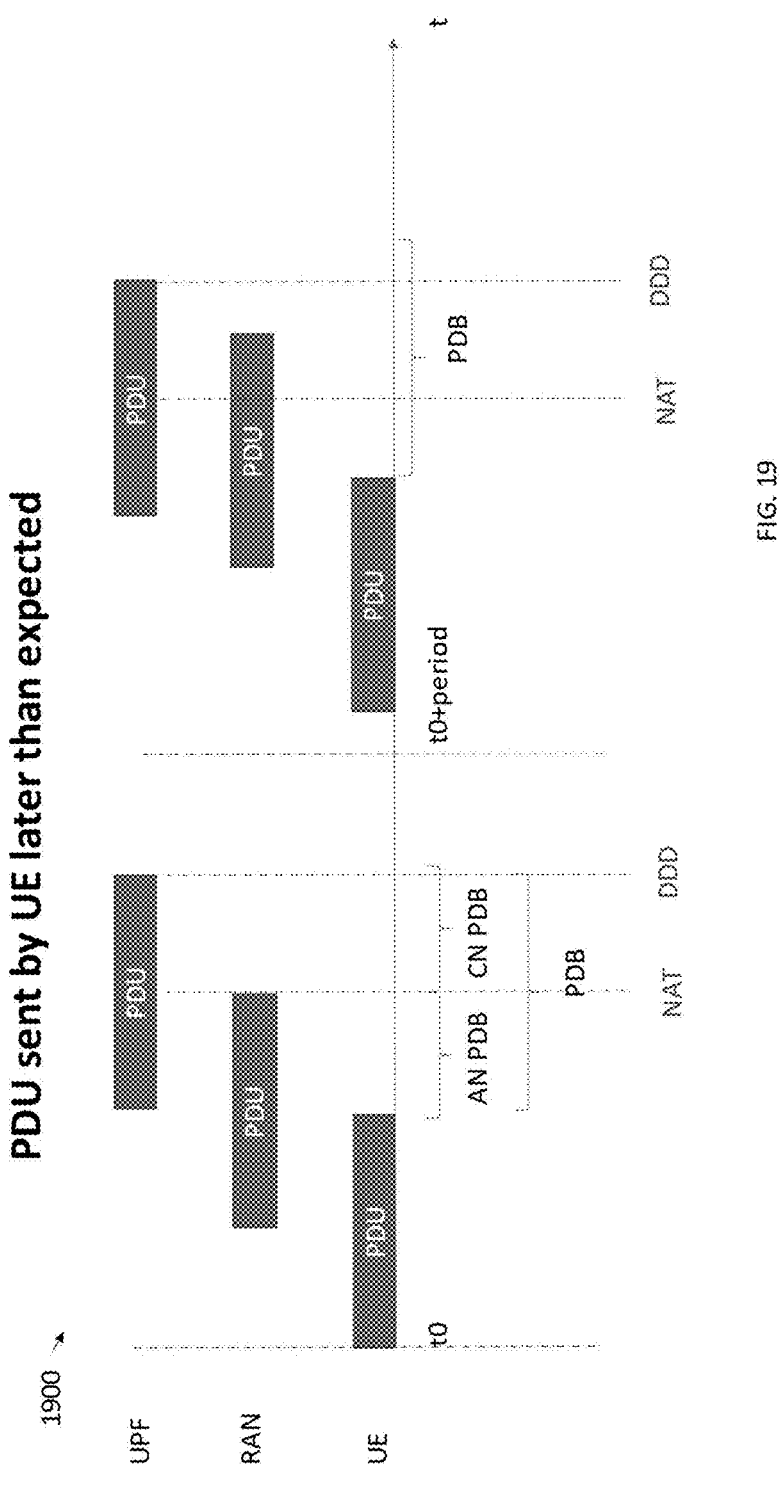
FIG. 19 is a diagram illustrating an example of operation when a PDU is transmitted by a UE later than expected.

FIG. 19 is a diagram illustrating an example 1900 of operation when PDU is transmitted by a UE later than expected. As shown in example 1900, a UE can transmit at time t0. RAN can transmit the PDU such that it is sent by an AN PDB and a NAT. In some aspects, the NDB can be equivalent to an access network packet delay budget (AN PDB). UPF can transmit the PDU such that it is sent by CN PDB and a DDD. In some aspects, a total PDB can be a sum of AN PDB and CN PDB.

Subsequently, the UE would be expected to transmit the PDU at an expected time (e.g., t0+period). As such, an expected NAT would be NAT+period and an expected DDD would be DDD+period. However, in some aspects, the UE can transmit the PDU later than expected, at a time later than the expected transmission time (e.g., at a time later than t0+period). RAN can then transmit the PDU later than expected, such that it arrives later the expected NAT. However, UPF may still be required to transmit the PDU by the expected DDD.

As indicated above, FIG. 19 is provided as an example. Other examples may differ from what is described with regard to FIG. 19.

Figure 20:
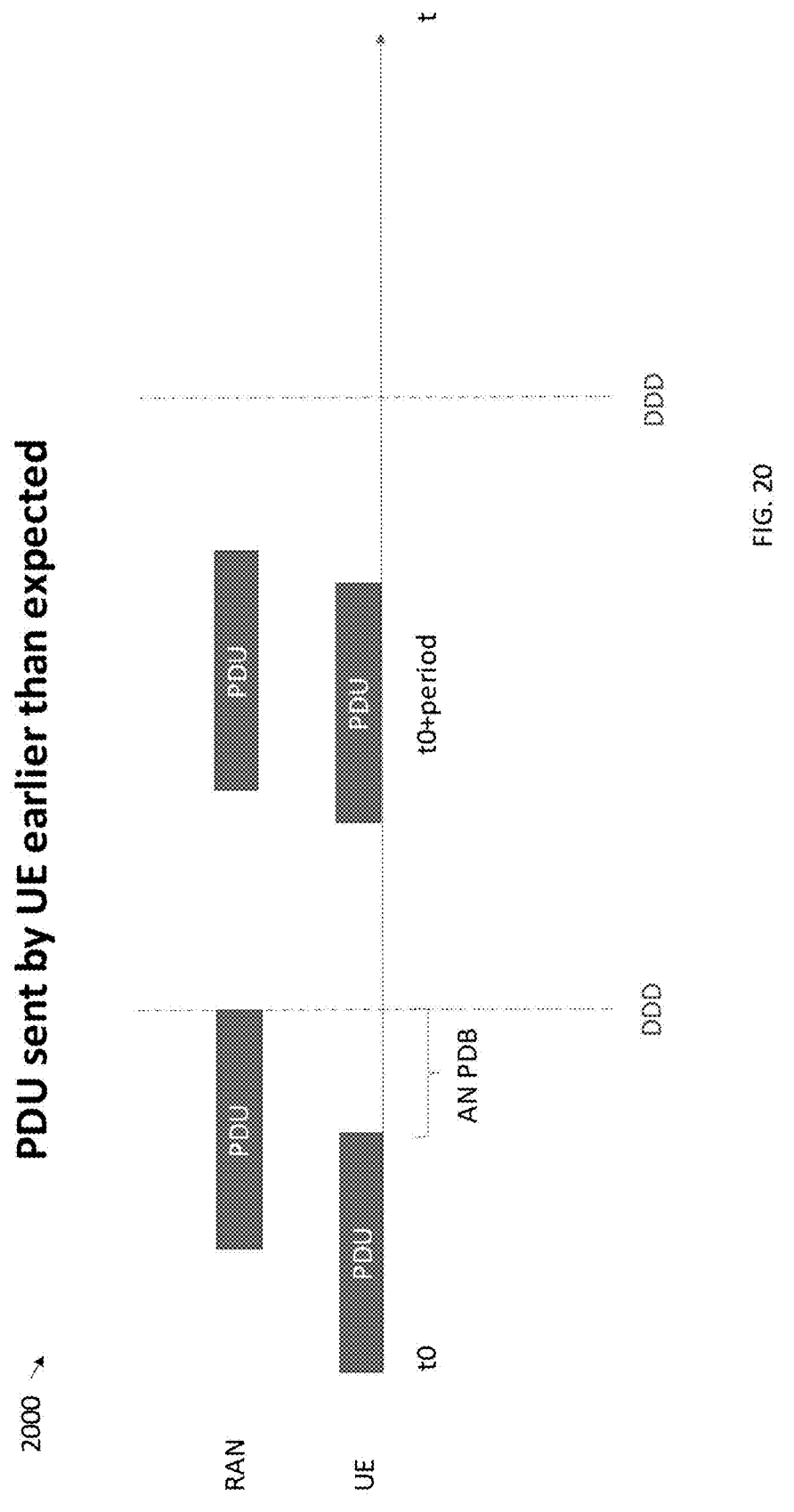
FIG. 20 is a diagram illustrating an example of operation when a PDU is transmitted by a UE earlier than expected.

FIG. 20 is a diagram illustrating an example 2000 of operation when a PDU is transmitted by a UE earlier than expected. As shown in example 2000, a UE can transmit at time t0. RAN can transmit the PDU such that it is sent by an AN PDB and a DDD.

Subsequently, the UE would be expected to transmit the PDU at an expected time (e.g., t0+period). As such, an expected DDD would be DDD+period. However, in some aspects, the UE can transmit the PDU earlier than expected, at a time before the expected transmission time (e.g., at a time before than t0+period). RAN can then transmit the PDU earlier than expected, such that it arrives before the expected DDD.

As indicated above, FIG. 20 is provided as an example. Other examples may differ from what is described with regard to FIG. 20.

Figure 21:
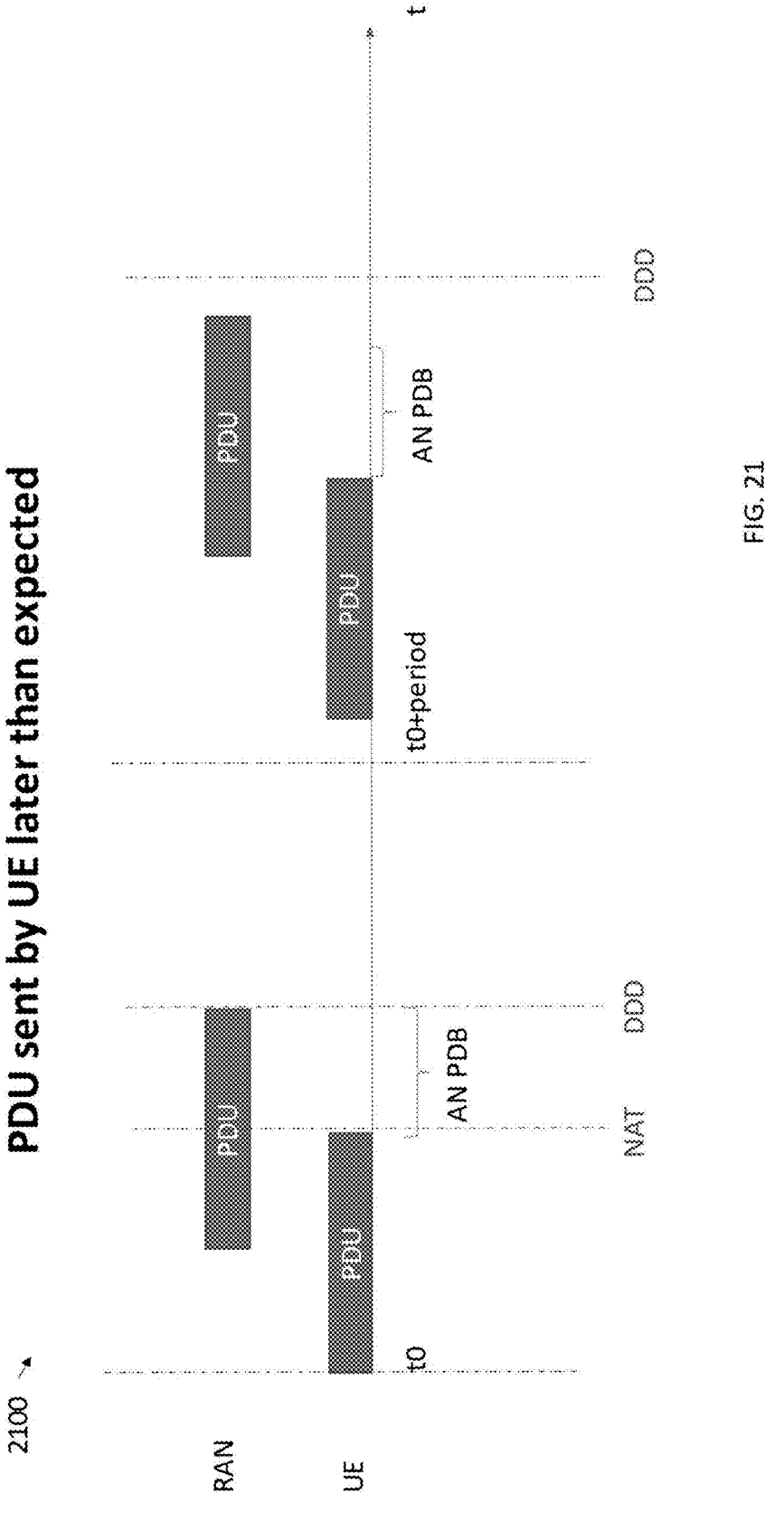
FIG. 21 is a diagram illustrating an example of operation when a PDU is transmitted by a UE later than expected.

FIG. 21 is a diagram illustrating an example 2100 of operation when a PDU is transmitted by a UE later than expected. As shown in example 2100, a UE can transmit at time t0. RAN can transmit the PDU such that it is sent by an AN PDB and a DDD.

Subsequently, the UE would be expected to transmit the PDU at an expected time (e.g., t0+period). As such, an expected DDD would be DDD+period. However, in some aspects, the UE can transmit the PDU later than expected, at a time later than the expected transmission time (e.g., at a time before than t0+period). RAN can then transmit the PDU later than expected, but it may still arrive before the expected DDD.

As indicated above, FIG. 21 is provided as an example. Other examples may differ from what is described with regard to FIG. 21.

Figure 22:
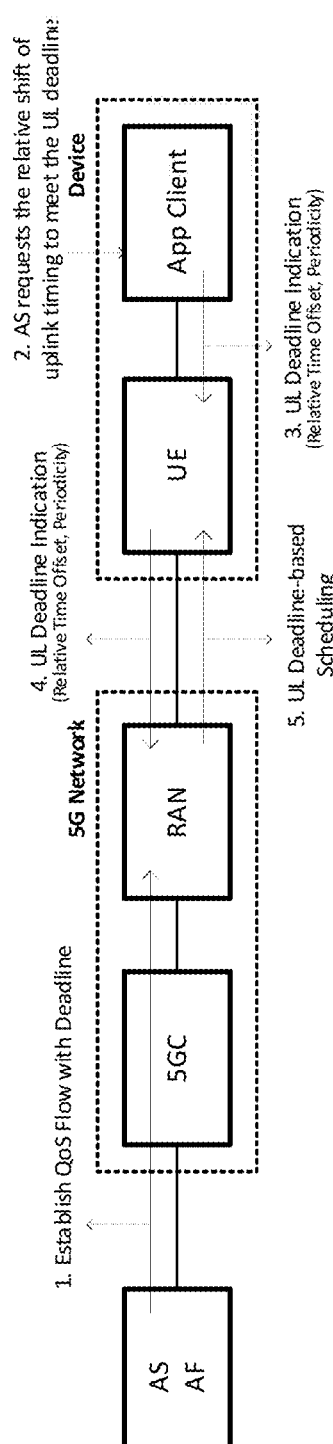
FIG. 22 is a diagram illustrating an example a UE-indicated deadline for an uplink.

FIG. 22 is a diagram illustrating an example 2200 a UE-indicated deadline for an uplink. As shown in example 2200, an Application Server AS can establish a QoS flow with a deadline through a 5G core (5GC) to a RAN, where a 5G network includes the RAN and the 5GC. The AS can request the relative shift of uplink timing to meet uplink deadline for a device. The device can include an application client and a UE. An uplink deadline indication including one or more of relative time offset, periodicity, and/or frequency can be sent from the application client to the UE. An uplink deadline indication including one or more of relative time offset, periodicity, and/or frequency can be sent from the UE to the RAN. An uplink deadline based scheduling can be sent from the RAN to the UE.

In some aspects, including an X-layer API, an application client receives the deadline of uplink traffic from the server, and indicates it to UE via an X-layer API. To avoid a strict synchronization requirement between server and client, the server requests to the client a relative time offset of uplink timing to meet an uplink deadline. For example, if an uplink (UL) PDU Set arrives at a server 2.5 ms later than the deadline, the server can request the client to shift the uplink timing by 2.5 ms. In some aspects, the application client requests the UE to reduce the delay budget of an uplink transmission. In some aspects, the application client shifts the uplink packet generation time earlier and latency is thereby increased.

In some aspects, including for 3GPP messages, a UE can indicate the deadline of a certain UL PDU set to a gNB. A new 3GPP message for an uplink deadline can include a MAC-CE or RRC at the protocol layer. These can include indicators relating to deadline, periodicity, frequency, PDU set identifier, QoS flow, or LCID. Periodicity information can also be delivered from the application server. In some aspects, the deadline can be defined by absolute time, as related to system frame number (SFN), subframe, slot, or the deadline can be defined by a relative time offset. Periodicity can be defined by unit of frame per second or hertz. A gNB can track the next estimated N-th deadline of uplink N-th PDU set or PDU as deadline+N*periodicity.

As indicated above, FIG. 22 is provided as an example. Other examples may differ from what is described with regard to FIG. 22.

Figure 23:
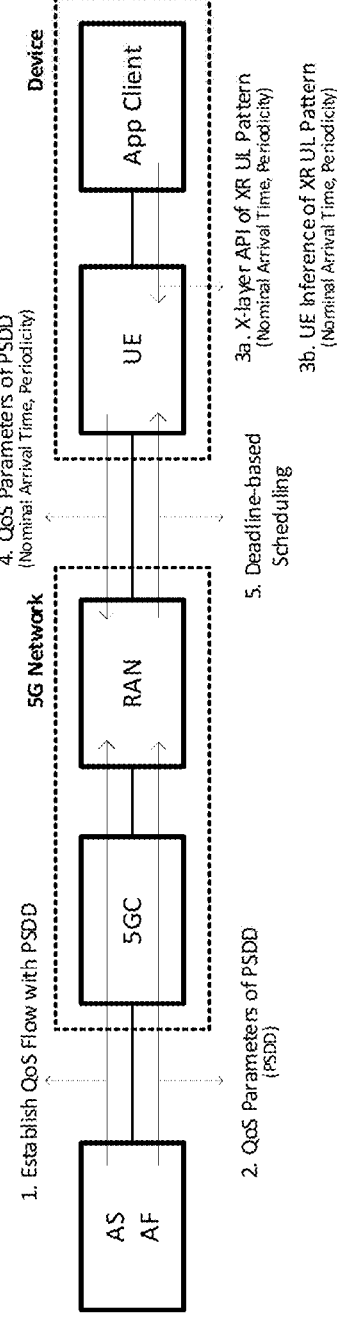
FIG. 23 is a diagram illustrating an example a 5GC-indicated deadline for an uplink.

FIG. 23 is a diagram illustrating an example 2300 a 5GC-indicated deadline for an uplink. As shown in example 2300, an Application Server AS can establish a QoS flow with a deadline through a 5G core (5GC) to a RAN, where a 5G network includes the RAN and the 5GC. The AS can also send QoS parameters of a PSDD to the RAN via the 5GC. The device can include an application client and a UE. An X-layer API of XR UL pattern can send an indicator with one or more of relative time offset, periodicity, and/or frequency to the UE or a UE inference of an XR UL pattern can be based on one or more of relative time offset, periodicity, and/or frequency. QoS parameters of the PSDD can be sent from the UE to the RAN, including one or more of relative time offset, periodicity, and/or frequency. An uplink deadline-based scheduling can be sent from the RAN to the UE.

In an aspect with an X-layer API, the UE can extract an XR traffic pattern for the uplink traffic. The UE may need the XR UL traffic pattern information including NAT and periodicity or frequency. Alternatively or additionally, for an X-layer API the application client may explicitly indicate the XR uplink traffic pattern to the UE with an X-layer API. This can eliminate ambiguity and strict information can be defined by the application client, but the client will need to adopt the new API. Alternatively or additionally, via A/ML the UE can infer the nominal arrival time and periodicity from incoming packets of the application client. Alternatively or additionally, the 5GC, rather than the UE, can provide the nominal arrival time of uplink traffic based on the information from the application function (AF) can (e.g., TSCAI). Alternatively or additionally, the 5GC rather than UE, can provide the deadline of UL traffic based on the information from the AF (e.g., TSCAI). This can provide compatibility with legacy application clients, but may require more time when XR patterns change.

In an aspect with 3GPP messages, the UE can indicate the nominal arrival time of a certain uplink PDU Set or PDU to a gNB. A new 3GPP message for uplink nominal arrival time can include a MAC-CE (e.g., Enhanced BSR) or RRC at the protocol layer. Indicators can include NAT, periodicity (or delivery from AF to RAN), frequency, PDU Set ID, QoS Flow or LCID. The gNB can attempt to deliver the next N-th PDU set or PDU according to NAT+PSDD+N*Periodicity.

As indicated above, FIG. 23 is provided as an example. Other examples may differ from what is described with regard to FIG. 23.

Figure 24:
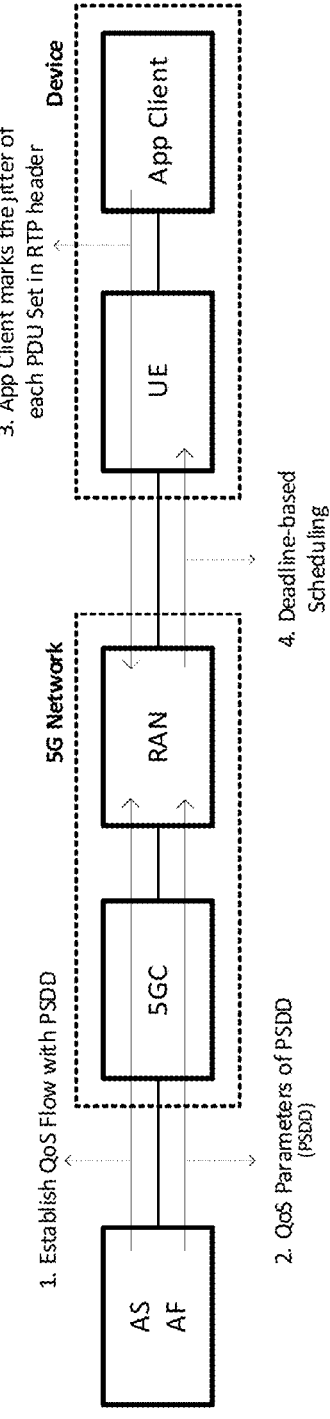
FIG. 24 is a diagram illustrating an example a client-indicated deadline for an uplink.

FIG. 24 is a diagram illustrating an example 2400 a client-indicated deadline for an uplink. As shown in example 2400, an Application Server AS can establish a QoS flow with a PSDD through a 5G core (5GC) to a RAN, where a 5G network includes the RAN and the 5GC. The AS can also send QoS parameters of a PSDD to the RAN via the 5GC. The device can include an application client and a UE. An application client can mark jitter of each PDU set or PDU in a RTP header sent to RAN. An uplink deadline-based scheduling can be sent from the RAN to the UE.

In an aspect with PDU set headers, an application client marks the jitter or the delay budget of each PDU set or PDU in an application-layer header. The application client can know the jitter of uplink PDU set based on generation time of the PDU set, so the application client marks the jitter in each PDU set header, accordingly. Thus the field of jitter or delay budget in the app-layer header design is added. A UE can reduce the delay budget of PDU Set header by the time consumed until the uplink packet of a PDU set or PDU is scheduled.

In some aspects, a relative delay budget offset (jitter) for each PDU set or PDU includes a gNB considering the relative delay budget as additional delay budget in addition to the fixed delay budget (e.g., PSDB, PSDD). For example, if the PSDD=10 ms, the jitter of PDU set is set at 2 ms. This PDU set should be delivered within 10 ms−(~2 ms)=12 ms.

In some aspects, absolute delay budget for each PDU set includes a gNB considering the absolute delay budget. The gNB internal delay from PDCP to MAC is subtracted at the gNB MAC layer. For example, the delay budget of a PDU set is 12 ms, therefore this PDU set should be delivered within 12 ms.

As indicated above, FIG. 24 is provided as an example. Other examples may differ from what is described with regard to FIG. 24.

Figure 25:
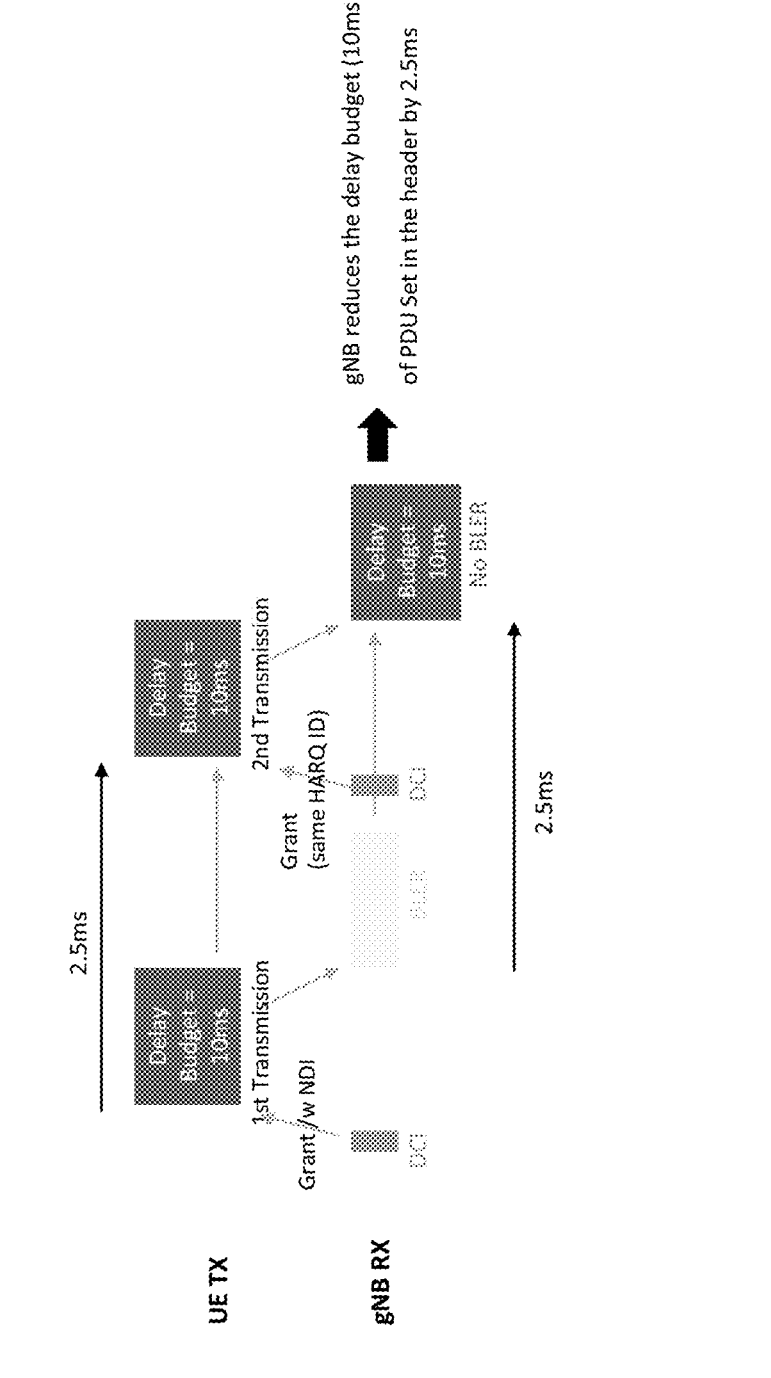
FIG. 25 is a diagram illustrating an example a client-indicated deadline for an uplink.

FIG. 25 is a diagram illustrating an example 2500 a client-indicated deadline for an uplink. In some aspects, a gNB can know the delay budget when the gNB receives an initial packet of a PDU set or a PDU and reads the header without error. If an initial uplink transmission has an error, the retransmission procedure (HARQ, ARQ) will take place, and the gNB will consume more time until it reads the delay budget in the header. However, since the delay budget of the header does not consider the retransmission time, the delay budget of the gNB varies according to the transmission times. Thus, it can be advantageous to consider the delay budget of the header when initiated from an initial transmission time of a first PDU alone or in a PDU set. In some aspects, if the uplink packet is not received by initial transmission, the gNB estimates the initial transmission time based on the same HARQ ID (MAC, HARQ) and the same SN (RLC, ARQ). In some aspects, the gNB substrates the time consumed by retransmission from the delay budget in the header. For example if HARQ retransmission takes 2.5 ms, the gNB reduces the delay budget of the header by 2.5 ms.

As shown in example 2500, a PDU Set can have a delay budget (e.g., 10 ms). Delay budget information can be included and/or written in metadata for the PDU Set (e.g., in a PDU Set header). Due to a retransmission time (e.g., 2.5 ms), a gNB may need to reduce the delay budget written in the PDU Set metadata. This reduction can modify the actual delay budget (e.g., 10 ms minus 2.5 ms retransmission time requirement equals 7.5 ms) for completion of the retransmission.

As indicated above, FIG. 25 is provided as an example. Other examples may differ from what is described with regard to FIG. 25.

Figure 26:
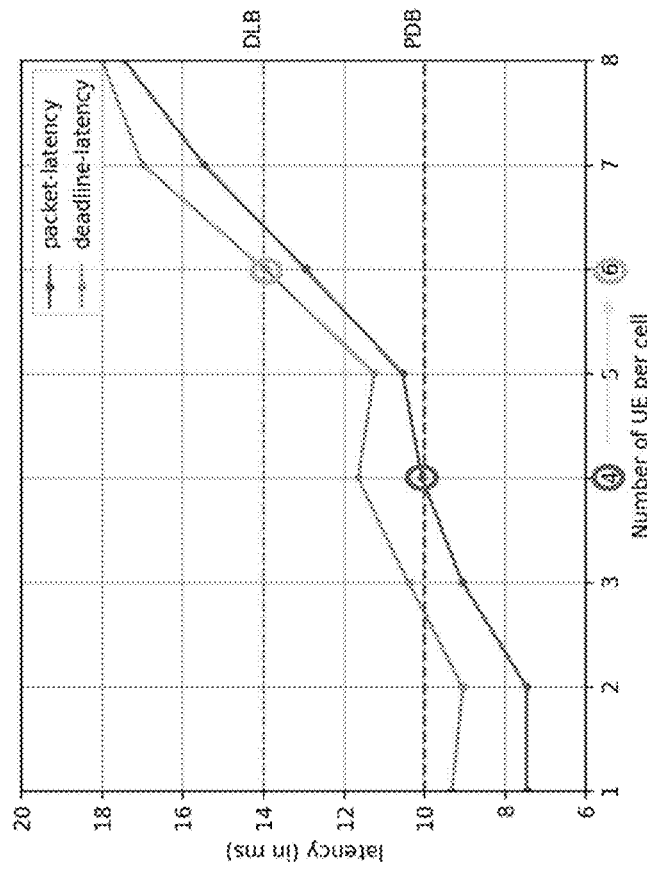
FIG. 26 is a diagram illustrating an example of capacity improvements using deadlines.

FIG. 26 is a diagram illustrating an example 2600 of capacity improvements using deadlines. As shown in example 2600, a number of UEs per cell can be increased using deadline latency versus using packet-latency. For example, capacity can be improved by 50% and 6 UEs can be included in a cell using deadlines, as opposed to only 4 UEs using PDB. Further optimizations are also possible in latency-aware schedulers, where CDRX offset can be set close to deadlines.

As indicated above, FIG. 26 is provided as an example. Other examples may differ from what is described with regard to FIG. 26.

Figure 27:
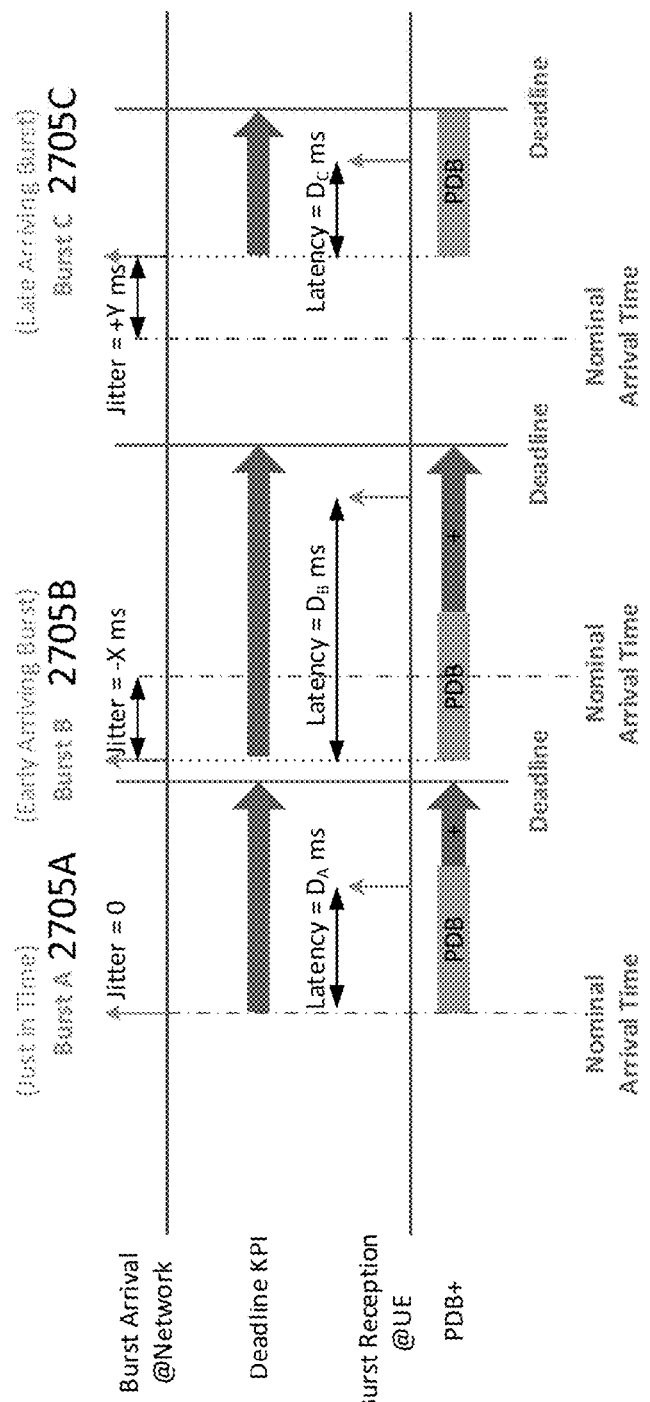
FIG. 27 is a diagram illustrating an example 2700 of periodic downlink traffic with jitter including capacity improvement compared to legacy PDB, in accordance with the present disclosure.

FIG. 27 is a diagram illustrating an example 2700 of periodic downlink traffic with jitter including capacity improvement compared to legacy PDB, in accordance with the present disclosure.

As shown in FIG. 27, a burst 2705A of data packets may be directed to a UE. The burst 2705A may arrive at a network (e.g., a network node, such as a RAN network node and/or a CN network node, among other examples) at a time indicated in FIG. 27 relative to a nominal arrival time. The nominal arrival time may be associated with a periodic arrival time, from which the burst 2705A may be offset by a jitter. However, the burst 2705A may arrive at the nominal arrival time, with a jitter of zero.

The network may transmit the burst 2705A with reception at the UE at a time indicated in FIG. 27. An amount of time between arrival at the network and reception at the UE is a latency. Latency can be different depending on when the burst arrives, but according to systems and methods described herein using deadlines, capacity is increased over existing PDB systems and methods, with a latency budget being relaxed for all but the latest arriving burst.

As indicated above, FIG. 27 is provided as an example. Other examples may differ from what is described with regard to FIG. 27.

Figure 28:
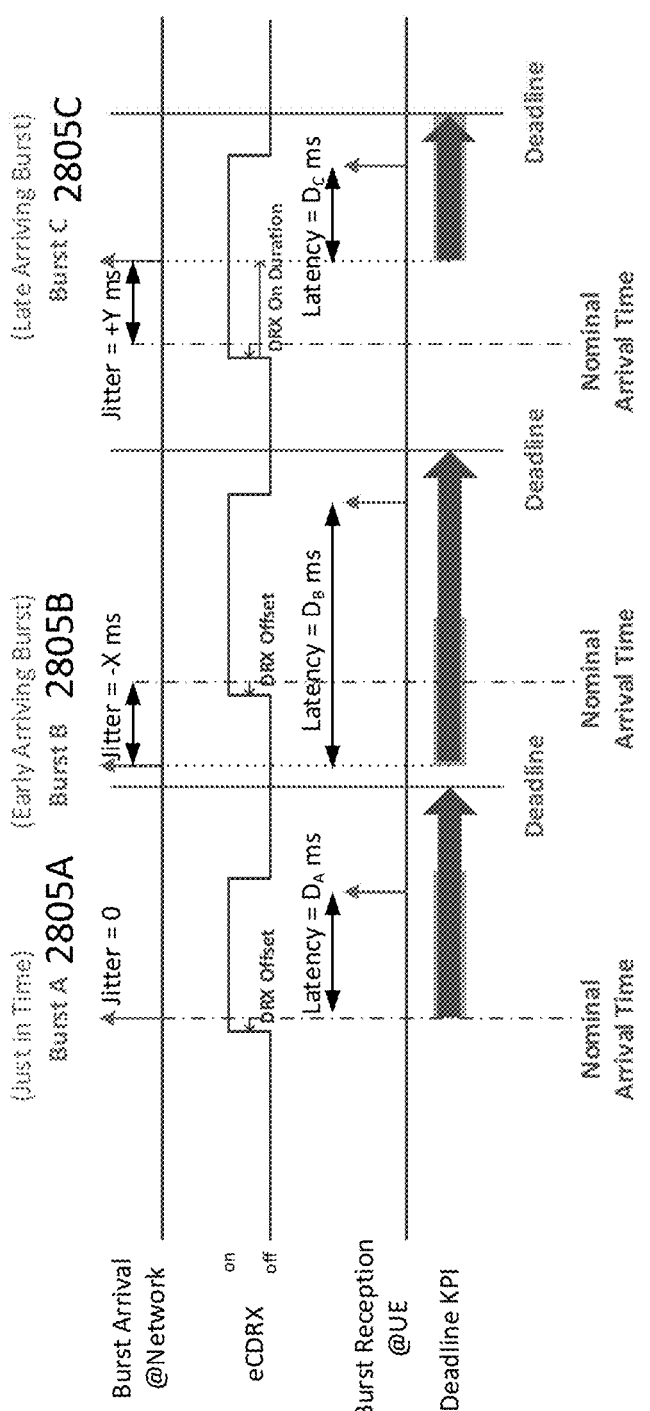
FIG. 28 is a diagram illustrating an example 2800 of periodic downlink traffic with jitter showing improved UE power consumption compared to legacy PDB, in accordance with the present disclosure.

FIG. 28 is a diagram illustrating an example 2800 of periodic downlink traffic with jitter showing improved UE power consumption compared to legacy PDB, in accordance with the present disclosure.

As shown in FIG. 28, a burst 2805A of data packets may be directed to a UE. The burst 2805A may arrive at a network (e.g., a network node, such as a RAN network node and/or a CN network node, among other examples) at a time indicated in FIG. 28 relative to a nominal arrival time. The nominal arrival time may be associated with a periodic arrival time, from which the burst 2805A may be offset by a jitter. However, the burst 2805A may arrive at the nominal arrival time, with a jitter of zero.

Burst 2805B can be delivered by the deadline, even if the discontinuous reception (DRX) offset is set late, compared to burst arrival. DRX on duration can be set to a small value and burst c 2805C is still covered.

As indicated above, FIG. 28 is provided as an example. Other examples may differ from what is described with regard to FIG. 28.

The following provides an overview of some Aspects of the present disclosure:

Aspect 1: A method for wireless communication performed by a user equipment (UE), comprising transmitting, to a network node, an indication of at least one of a data delivery deadline for data traffic to be delivered by the network node, wherein the data delivery deadline indicates by when the network node is to transmit one or more data packets received from the UE, or a nominal arrival time for the data traffic to be received at the network node, wherein the nominal arrival time in combination with a nominal delay budget indicates by when the network node is to transmit the one or more data packets received from the UE; and transmitting, to the network node, the one or more data packets, wherein the one or more data packets may include a PDU or a group of PDUs or a PDU set or burst, wherein the one or more data packets include a protocol data unit (PDU), a group of PDUs, or a PDU set or burst.

Aspect 2: The method of Aspect 1, wherein the nominal delay budget is the access network packet delay budget.

Aspect 3: The method of any of Aspects 1 or 2, wherein transmitting the indication to the network node comprises transmitting the indication of the data delivery deadline for the data traffic to be delivered by the network node, or transmitting the indication of the nominal arrival time for the data traffic to be received at the network node.

Aspect 4: The method of any of Aspects 1-3, further comprising transmitting, to the network node, an indication of a periodicity or a frequency of the data delivery deadline for data traffic to be delivered by the network node or the nominal arrival time for the data traffic to be received at the network node.

Aspect 5: The method of any of Aspects 1-4, further comprising estimating, at the UE, the data delivery deadline of a subsequent one or more data packets by adding a value corresponding to the indicated periodicity or frequency to a current data delivery deadline or a current nominal arrival time.

Aspect 6: The method of any of Aspects 1-5, wherein the data delivery deadline or the nominal arrival time overrides a packet delay budget from an actual arrival time of the one or more data packets from the UE.

Aspect 7: The method of any of Aspects 1-6, further comprising dynamically adjusting, by a client application hosted on the UE, the data delivery deadline for the data traffic to be delivered to the network node based on a quality of service (QoS) flow or one or more data radio bearer (DRB) QoS parameters.

Aspect 8: The method of any of Aspects 1-7, further comprising providing, by a client application hosted on the UE, the data delivery deadline to the UE with a crosslink application programming interface, or determining, by a client application hosted on the UE, the nominal arrival time based on a timing when the client application generates the one or more data packets.

Aspect 9: The method of any of Aspects 1-8, further comprising receiving, by a client application hosted on the UE, a relative time offset of uplink timing to meet the data delivery deadline; and determining the data delivery deadline based on the relative time offset.

Aspect 10: The method of any of Aspects 1-9, further comprising further comprising calculating the nominal arrival time for the data traffic based on incoming data packets received from a client application hosted on the UE and adjusting the nominal arrival time based on timing of the received incoming data packets.

Aspect 11: The method of any of Aspects 1-10, further comprising marking a jitter or delay budget in a header of each of the incoming data packets delivered by the client application to the UE; and adjusting the nominal arrival time based on the timing indicated by the jitter or the delay budget in the header of each of the data packets.

Aspect 12: The method of any of Aspects 1-11, further comprising estimating additional time consumed by retransmission of the one or more data packets.

Aspect 13: The method of Aspect 12, further comprising converting the data delivery deadline into a radio access network (RAN) time domain to create a converted deadline for the network node.

Aspect 14: The method of any of Aspects 1-13, wherein converting the data delivery deadline into a RAN time domain comprises converting the deadline from an application time domain into the RAN time domain based at least in part on one or more of a deadline mapping associated with a quality of service (QoS) flow, one or more deadline notification messages, or one or more data radio bearer (DRB) QoS parameters associated with the deadline.

Aspect 15: The method of any of Aspects 1-14, further comprising transmitting, by the network node, the one or more data packets from the UE at a time between an actual arrival time of the one or more data packets from the UE and the data delivery deadline or the nominal arrival time added to the nominal delay budget.

Aspect 16: An apparatus for wireless communication at a device, comprising one or more processors; one or more memories coupled with the one or more processors; and instructions stored in the one or more memories and executable by the one or more processors, individually or in combination, to cause the apparatus to perform the method of one or more of Aspects 1-15.

Aspect 17: An apparatus for wireless communication, comprising at least one means for performing the method of one or more of Aspects 1-15.

Aspect 18: One or more non-transitory computer-readable media, individually or in combination, storing code for wireless communication the code comprising instructions executable by one or more processors, individually or in combination, to perform the method of one or more of Aspects 1-15.

Aspect 19: One or more non-transitory computer-readable media, individually or in combination, storing a set of instructions for wireless communication, the set of instructions comprising one or more instructions that, when executed by one or more processors of a device, individually or in combination, cause the device to perform the method of one or more of Aspects 1-18.

Aspect 20: A method for wireless communication performed by a network node, the method comprising receiving, by the network node, an indication of a data delivery deadline for data traffic to be delivered by the network node, wherein the data delivery deadline indicates by when the network node is to transmit one or more data packets received from a user equipment UE); receiving, by the network node, the one or more data packets from the UE; and transmitting, by the network node, the one or more data packets from the UE at a time between an actual arrival time of the one or more data packets from the UE and the data delivery deadline wherein, the one or more data packets include a protocol data unit (PDU), a group of PDUs, or a PDU set or burst.

Aspect 21: The method of Aspect 20, further comprising a nominal delay budget.

Aspect 22: The method of Aspects 20 or 21, wherein receiving the indication by the network node comprises receiving the indication of the data delivery deadline for the data traffic to be delivered by the network node, or receiving the indication of the nominal arrival time for the data traffic to be received at the network node.

Aspect 23: The method of any of Aspects 20-22, further comprising receiving, by the network node, an indication of a periodicity or a frequency of the data delivery deadline for data traffic to be delivered by the network node or the nominal arrival time for the data traffic to be received at the network node.

Aspect 24: The method of any of Aspects 20-23, further comprising estimating, by the network node, the data delivery deadline or the nominal arrival time of a subsequent one or more data packets by adding a value corresponding to the indicated periodicity or frequency to a current data delivery deadline or a current nominal arrival time.

Aspect 25: The method of any of Aspects 20-24, wherein the data delivery deadline or the nominal arrival overrides a packet delay budget from an actual arrival time of the one more data packets from the UE.

Aspect 26: The method of any of Aspects 20-25, wherein the data delivery deadline for the data traffic to be delivered to the network node is dynamically adjusted based on a quality of service (QoS) flow or one or more data radio bearer (DRB) QoS parameters, based on a client application hosted on the UE.

Aspect 27: The method of any of Aspects 20-26, wherein a client application hosted on the UE provides the data delivery deadline to the UE with a crosslink application programming interface, or the nominal arrival time is determined based on a timing when the client application generates the one or more data packets.

Aspect 28: The method of any of Aspects 20-27, wherein a relative time offset of uplink timing to meet the data delivery deadline is received by a client application hosted on the UE; and further comprising determining the data delivery deadline based on the relative time offset.

Aspect 29: The method of any of Aspects 20-28, the nominal arrival time for the data traffic is calculated based on incoming data packets received from a client application hosted on the UE; and the nominal arrival time is adjusted based on timing of the received incoming data packets.

Aspect 30: The method of any of Aspects 20-29, a jitter or delay budget is marked in a header of each of the incoming data packets received from the client application on the UE; and the nominal arrival time is adjusted based on the timing indicated by the jitter or the delay budget in the header of each of the data packets.

Aspect 31: The method of any of Aspects 20-30, wherein additional time consumed by retransmission of the one or more data packets is estimated.

Aspect 32: The method of any of Aspects 20-31, wherein the data delivery deadline is converted into a radio access network (RAN) time domain to create a converted deadline for the network node.

Aspect 33: The method of any of Aspects 20-32, wherein converting the data delivery deadline into a RAN time domain comprises converting the data delivery deadline from an application time domain into the RAN time domain based at least in part on one or more of a deadline mapping associated with a quality of service (QoS) flow, one or more deadline notification messages, or one or more data radio bearer (DRB) QoS parameters associated with the deadline.

Aspect 34: The method of any of Aspects 20-33, transmitting, by the network node, the one or more data packets from the UE at a time between an actual arrival time of the one or more data packets from the UE and the data delivery deadline or the nominal arrival time added to the nominal delay budget.

Aspect 35: A network node for wireless communication, comprising one or more memories; and one or more processors, coupled to the one or more memories, individually or in combination configured to receive an indication of a data delivery deadline for data traffic to be delivered by the network node, wherein the data delivery deadline indicates by when the network node is to transmit one or more data packets received from a user equipment (UE), receive the one or more data packets from the UE, and transmit the one or more data packets from the UE at a time between an actual arrival time of the one or more data packets from the UE and the data delivery deadline, wherein the one or more data packets include a protocol data unit (PDU), a group of PDUs, or a PDU set or burst.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions execut- able by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instruc- tions for performing action X, and at least a second proces- sor may be coupled to at least a second memory storing instructions for performing actions Y and Z, and the first processor and the second processor may, in combination, execute the respective subset of instructions to accomplish performing actions X, Y, and Z. Alternatively, three proces- sors may access one of three different memories each storing one of instructions for performing X, Y, or Z, and the three processors may in combination execute the respective subset of instructions to accomplish performing actions X, Y, and Z. Alternatively, a single processor may execute the instruc- tions stored on a single memory, or distributed across multiple memories, to accomplish performing actions X, Y, and Z.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated other- wise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for wireless communication by a user equip- ment (UE), comprising:
   transmitting, to a network node, an indication of
   a nominal arrival time for data traffic to be received at the network node, wherein the nominal arrival time in combination with a nominal delay budget indicates a data delivery deadline for the data traffic to be delivered by the network node, the data delivery deadline indi- cating by when the network node is to transmit one or more data packets received from the UE; and
   transmitting, to the network node, the one or more data packets, wherein the one or more data packets include a protocol data unit (PDU).

2. The method of claim 1, wherein the nominal delay budget is an access network packet delay budget and wherein the one or more data packets include a group of PDUs, a PDU set, or burst.

3. The method of claim 1, further comprising:
   transmitting an indication of the data delivery deadline for the data traffic to be delivered by the network node.

4. The method of claim 1, further comprising:
   transmitting, to the network node, an indication of a periodicity or a frequency of the data delivery deadline for the data traffic to be delivered by the network node or the nominal arrival time for the data traffic to be received at the network node.

5. The method of claim 4, further comprising:
   estimating, at the UE, the data delivery deadline or the nominal arrival time of a subsequent one or more data packets by adding a value corresponding to the indi- cated periodicity or frequency to a current data delivery deadline or a current nominal arrival time.

6. The method of claim 1, wherein the data delivery deadline overrides a packet delay budget from an actual arrival time of the one or more data packets from the UE.

7. The method of claim 1,
   wherein the data delivery deadline for the data traffic to be delivered by the network node is based on a quality of service (QoS) flow or one or more data radio bearer (DRB) QoS parameters.

8. The method of claim 1, further comprising:
   receiving, from a client application hosted on the UE with a crosslink application programming interface, the data delivery deadline.

9. The method of claim 1, further comprising:
   receiving, from a client application hosted on the UE, a relative time offset of uplink timing to meet the data delivery deadline; and
   determining the data delivery deadline based on the relative time offset.

10. The method of claim 1, further comprising:
    inferring the nominal arrival time for the data traffic based on a timing of the one or more data packets received from a client application hosted on the UE.

11. The method of claim 1,
    wherein a header of each of the one or more data packets includes a mark of jitter or delay budget received from a client application on the UE; and
    the nominal arrival time is based on a timing indicated by the jitter or the delay budget in the header of each of the one or more data packets.

12. The method of claim 1,
wherein the nominal delay budget is based on an estimate of additional time consumed by retransmission of the one or more data packets.

13. The method of claim 1, further comprising:
converting the data delivery deadline into a radio access network (RAN) time domain to create a converted deadline for the network node.

14. The method of claim 13, wherein converting the data delivery deadline into a RAN time domain comprises converting the data delivery deadline from an application time domain into the RAN time domain based at least in part on one or more of:

a deadline mapping associated with a quality of service (QoS) flow, one or more deadline notification messages, or one or more data radio bearer (DRB) QoS parameters associated with the deadline.

15. The method of claim 1, wherein the nominal arrival time is based on a generation time of the one or more data packets.

16. A user equipment (UE) for wireless communication, comprising:

one or more memories; and one or more processors, coupled to the one or more memories, individually or in combination configured to:

transmit, to a network node, an indication of at least one of:

a nominal arrival time for data traffic to be received at the network node, wherein the nominal arrival time in combination with a nominal delay budget indicates a data delivery deadline for the data traffic to be delivered by the network node, the data delivery deadline indicating by when the network node is to transmit one or more data packets received from the UE; and transmit, to the network node, the one or more data packets, wherein the one or more data packets include a protocol data unit (PDU).

17. A method for wireless communication by a network node, the method comprising:

receiving, by the network node, an indication of a nominal arrival time for data traffic to be received at the network node, the nominal arrival time in combination with a nominal delay budget indicating a data delivery deadline for the data traffic to be delivered by the network node, wherein the data delivery deadline indicates by when the network node is to transmit one or more data packets received from a user equipment (UE); and receiving, by the network node, the one or more data packets from the UE, wherein the one or more data packets include a protocol data unit (PDU).

18. The method of claim 17, wherein the nominal delay budget is an access network packet delay budget and wherein the one or more data packets include a group of PDUs, a PDU set, or burst.

19. The method of claim 17, further comprising:
receiving an indication of the data delivery deadline for the data traffic to be delivered by the network node.

20. The method of claim 17, further comprising:
receiving, by the network node, an indication of a periodicity or a frequency of the data delivery deadline for the data traffic to be delivered by the network node or the nominal arrival time for the data traffic to be received at the network node.

21. The method of claim 20, further comprising:
estimating, by the network node, the data delivery deadline or the nominal arrival time of a subsequent one or more data packets by adding a value corresponding to the indicated periodicity or frequency to a current data delivery deadline or a current nominal arrival time.

22. The method of claim 17, wherein the data delivery deadline overrides a packet delay budget from an actual arrival time of the one or more data packets from the UE.

23. The method of claim 17, wherein the data delivery deadline for the data traffic to be delivered by the network node is based on a quality of service (QoS) flow or one or more data radio bearer (DRB) QOS parameters.

24. The method of claim 17, wherein the nominal arrival time is based on a generation time of the one or more data packets.

25. The method of claim 17, further comprising:
receiving, from the UE, a relative time offset of uplink timing to meet the data delivery deadline; and determining the data delivery deadline based on the relative time offset.

26. The method of claim 17, wherein
the nominal arrival time for the data traffic is based on a timing of the one or more data packets from a client application hosted on the UE.

27. The method of claim 17, wherein
a header of each of the one or more data packets includes a mark of jitter or delay budget from a client application on the UE; and the nominal arrival time is based on a timing indicated by the jitter or the delay budget in the header of each of the one or more data packets.

28. The method of claim 17, further comprising:
estimating additional time consumed by retransmission of the one or more data packets, wherein the nominal delay budget is based on the estimate.

29. The method of claim 17, further comprising:
transmitting, by the network node, the one or more data packets from the UE at a time between an actual arrival time of the one or more data packets from the UE and the data delivery deadline or the nominal arrival time added to the nominal delay budget.

30. A network node for wireless communication, comprising:

one or more memories; and one or more processors, coupled to the one or more memories, individually or in combination configured to:

receive an indication of a nominal arrival time for data traffic to be received at the network node, the nominal arrival time in combination with a nominal delay budget indicating a data delivery deadline for the data traffic to be delivered by the network node, wherein the data delivery deadline indicates by when the network node is to transmit one or more data packets received from a user equipment (UE), and receive the one or more data packets from the UE, wherein the one or more data packets include a protocol data unit (PDU).

\* \* \* \* \*